US010216576B2

(12) United States Patent
Grube et al.

(10) Patent No.: US 10,216,576 B2
(45) Date of Patent: *Feb. 26, 2019

(54) ENCODING DATA UTILIZING A ZERO INFORMATION GAIN FUNCTION

(71) Applicant: CLEVERSAFE, INC., Chicago, IL (US)

(72) Inventors: Gary W. Grube, Barrington Hills, IL (US); Timothy W. Markison, Mesa, AZ (US)

(73) Assignee: International Business Machines Corporation, Armonk, NY (US)

( * ) Notice: Subject to any disclaimer, the term of this patent is extended or adjusted under 35 U.S.C. 154(b) by 87 days.

This patent is subject to a terminal disclaimer.

(21) Appl. No.: 14/217,662

(22) Filed: Mar. 18, 2014

(65) Prior Publication Data
US 2014/0201567 A1 Jul. 17, 2014

Related U.S. Application Data

(63) Continuation of application No. 13/611,962, filed on Sep. 12, 2012, now Pat. No. 8,677,214.
(Continued)

(51) Int. Cl.
*G06F 11/00* (2006.01)
*G06F 11/10* (2006.01)
(Continued)

(52) U.S. Cl.
CPC ...... *G06F 11/1076* (2013.01); *G06F 11/1096* (2013.01); *G06F 21/6227* (2013.01);
(Continued)

(58) Field of Classification Search
CPC ............. G06F 11/1076; G06F 11/1008; G06F 11/1068; G06F 11/1044; G11C 7/1006;
(Continued)

(56) References Cited

U.S. PATENT DOCUMENTS 6,732,322 B1 * 5/2004 Miyauchi ............ G06F 11/1008
714/756
7,472,334 B1 * 12/2008 Scott .................... H03M 13/151
714/785
(Continued)

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

*Primary Examiner* — Guy J Lamarre
*Assistant Examiner* — Osman M Alshack
(74) *Attorney, Agent, or Firm* — Garlick & Markison; Timothy W. Markison; Timothy D. Taylor

(57) ABSTRACT

A method begins by a dispersed storage (DS) processing module encoding data using a dispersed storage error coding function to produce a set of encoded data slices. The method continues with the DS processing module encoding a first encoded data slice of the set of encoded data slices using a zero information gain (ZIG) function based on a second encoded data slice of the set of encoded data slices to produce a ZIG encoded data slice. The method continues with the DS processing module outputting the ZIG encoded data slice and a subset of encoded data slices of the set of encoded data slices, wherein the subset of encoded data slices includes less than a decode threshold number of encoded data slices and does not include the first or the second encoded data slice.

10 Claims, 18 Drawing Sheets

Related U.S. Application Data

(60) Provisional application No. 61/542,914, filed on Oct. 4, 2011.

(51) Int. Cl.
   *H03M 13/00*   (2006.01)
   *H03M 13/37*   (2006.01)
   *G06F 21/62*   (2013.01)
   *H04L 29/08*   (2006.01)
   *H03M 13/09*   (2006.01)
   *H03M 13/15*   (2006.01)
   *H03M 13/19*   (2006.01)
   *H03M 13/23*   (2006.01)
   *H03M 13/29*   (2006.01)
   *H03M 11/08*   (2006.01)

(52) U.S. Cl.
   CPC ..... *H03M 13/3761* (2013.01); *H03M 13/616* (2013.01); *H04L 67/1097* (2013.01); *H03M 11/08* (2013.01); *H03M 13/09* (2013.01); *H03M 13/15* (2013.01); *H03M 13/152* (2013.01); *H03M 13/1515* (2013.01); *H03M 13/19* (2013.01); *H03M 13/23* (2013.01); *H03M 13/2906* (2013.01)

(58) Field of Classification Search
   CPC . G11B 20/1833; H04L 1/0041; H04L 1/0057; H03M 13/11; H03M 13/27
   USPC ................................. 714/752, 763
   See application file for complete search history.

(56) References Cited

U.S. PATENT DOCUMENTS

| | | | | |
|---|---|---|---|---|
| 7,636,724 | B2 | 12/2009 | de la Torre et al. | |
| 8,250,433 | B2* | 8/2012 | Wylie | H03M 13/015 714/758 |
| 8,281,181 | B2* | 10/2012 | Resch | G06F 11/10 714/6.2 |
| 8,341,500 | B2* | 12/2012 | Byom | G11C 16/26 365/185.33 |
| 8,965,956 | B2* | 2/2015 | Palthepu | H04L 67/1097 709/203 |
| 2007/0079082 | A1* | 4/2007 | Gladwin | G06F 11/1076 711/154 |
| 2008/0200240 | A1* | 8/2008 | Saltiel | G07F 17/32 463/25 |
| 2008/0209304 | A1* | 8/2008 | Winarski | G06F 11/1088 714/763 |
| 2010/0023524 | A1* | 1/2010 | Gladwin | G06F 3/0617 707/E17.032 |
| 2010/0169391 | A1* | 7/2010 | Baptist | G06F 17/30126 707/827 |
| 2010/0218037 | A1* | 8/2010 | Swartz | G06F 17/30 714/6.12 |

* cited by examiner

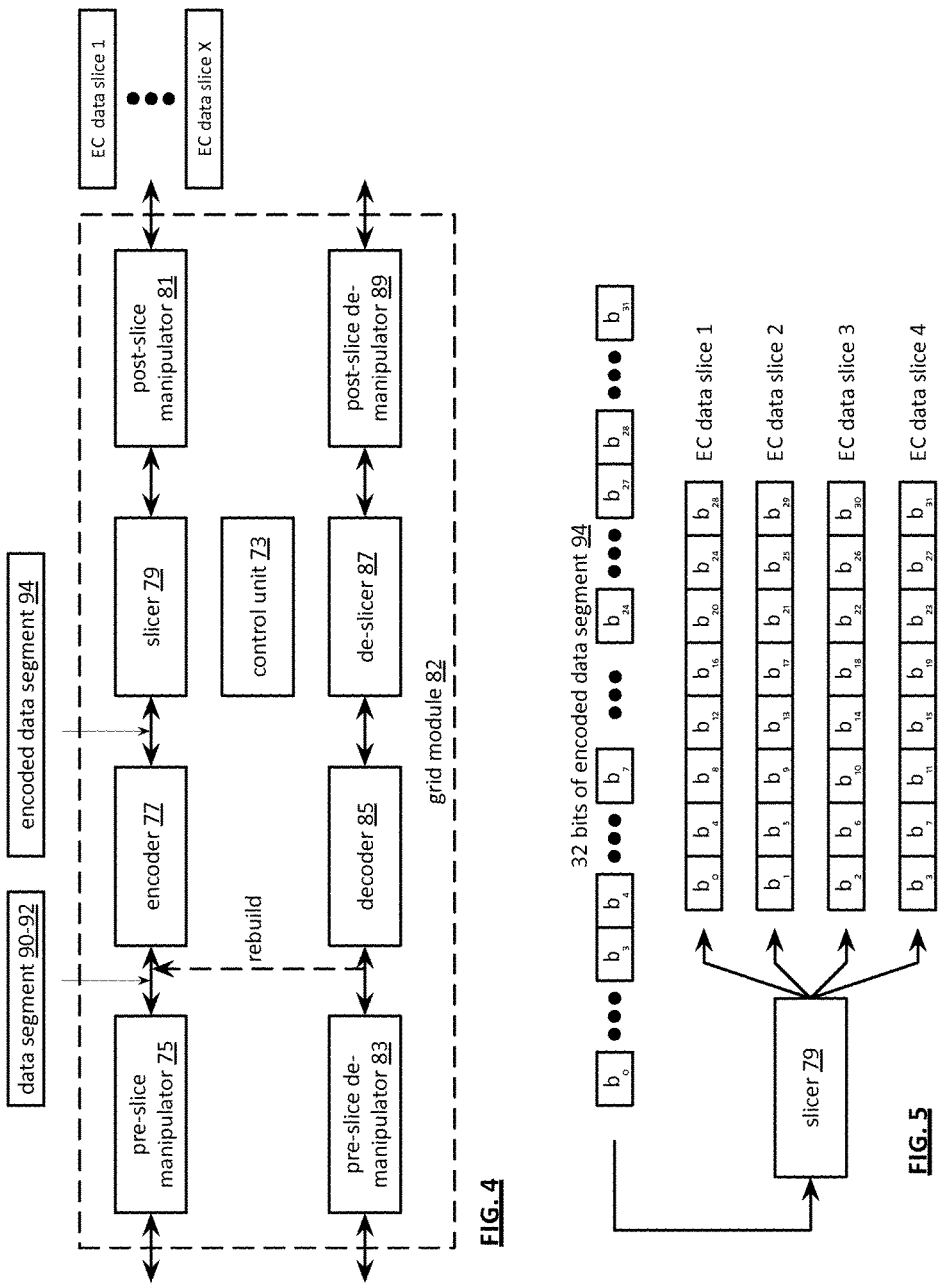

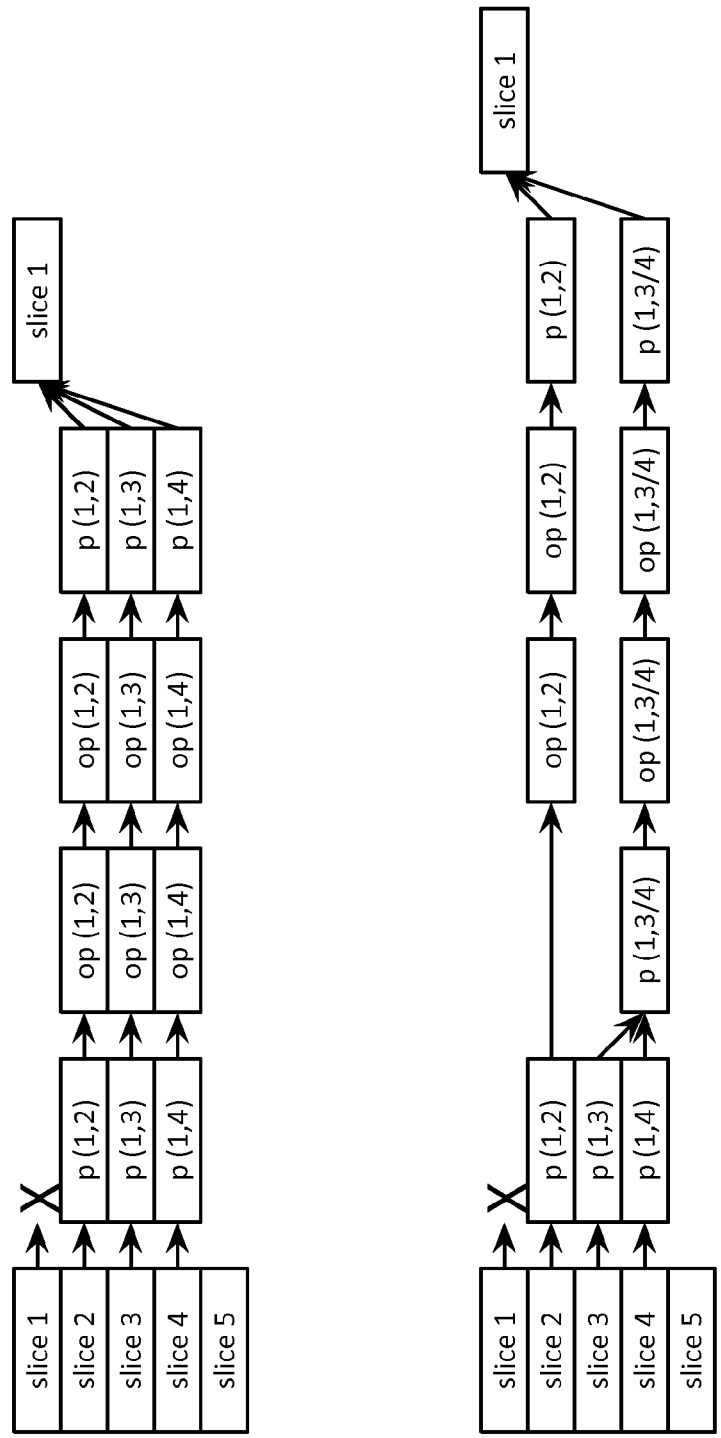

US 10,216,576 B2

ENCODING DATA UTILIZING A ZERO INFORMATION GAIN FUNCTION

CROSS REFERENCE TO RELATED PATENTS

The present U.S. Utility Patent Application claims priority pursuant to 35 U.S.C. § 120 as a continuation of U.S. Utility application Ser. No. 13/611,962, entitled "ENCODING DATA UTILIZING A ZERO INFORMATION GAIN FUNCTION", filed Sep. 12, 2012, issuing as U.S. Pat. No. 8,677,214 on Mar. 18, 2014, which claims priority pursuant to 35 U.S.C. § 119(e) to U.S. Provisional Application No. 61/542,914, entitled "DATA TRANSFER UTILIZING DISPERSED STORAGE ENCODING", filed Oct. 4, 2011, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the present invention;

FIG. 5 is a diagram of an example embodiment of error coded data slice creation in accordance with the present invention;

FIG. 9A is a diagram illustrating an example of generation of a set of zero information gain (ZIG) encoded data slices in accordance with the present invention;

FIG. 9B is a diagram illustrating another example of generation of a set of zero information gain (ZIG) encoded data slices in accordance with the present invention;

DETAILED DESCRIPTION OF THE INVENTION

Figure 1:
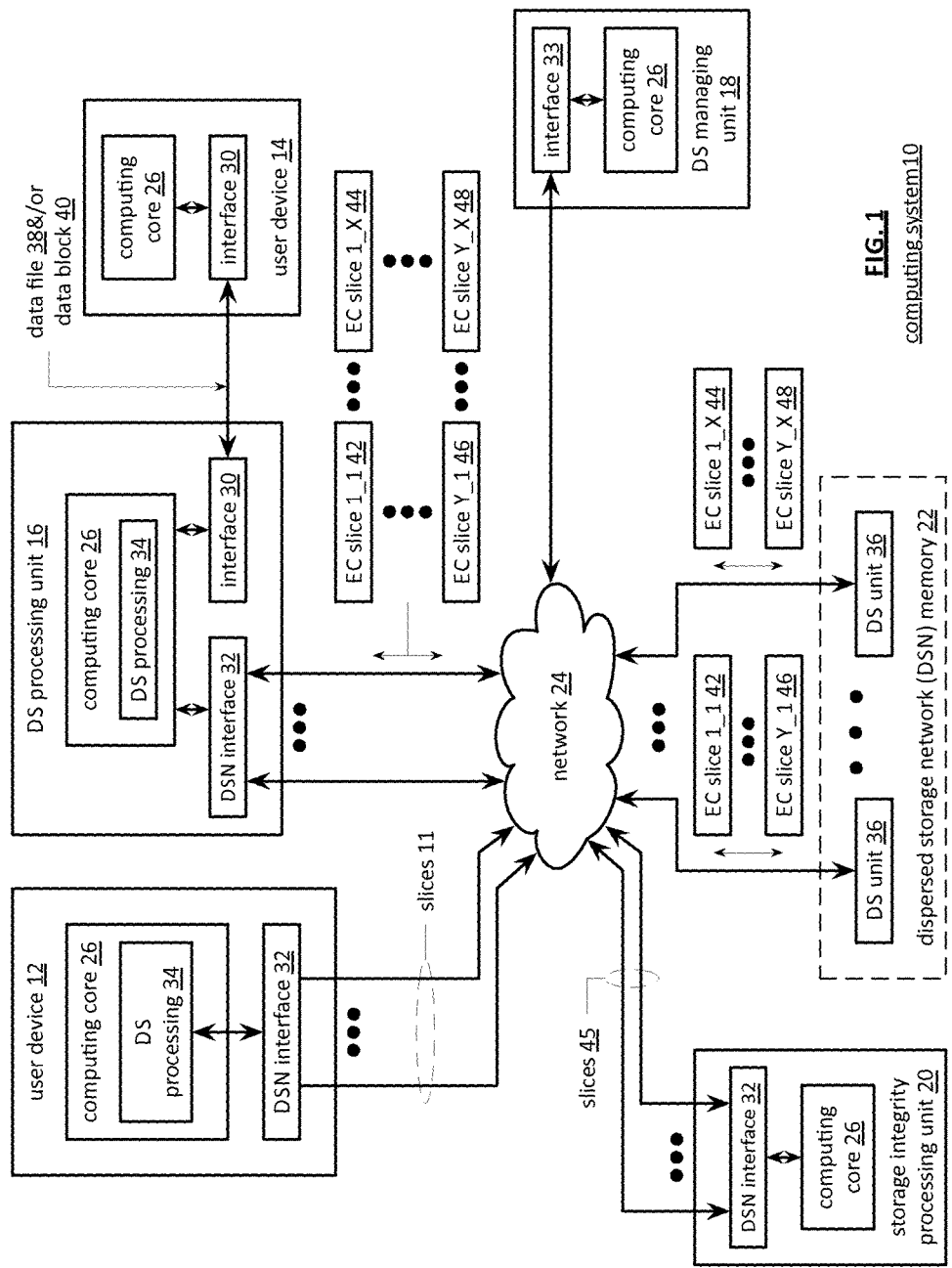
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of the encoding the data segments will be provided with reference to one or more of FIGS. 2-12.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
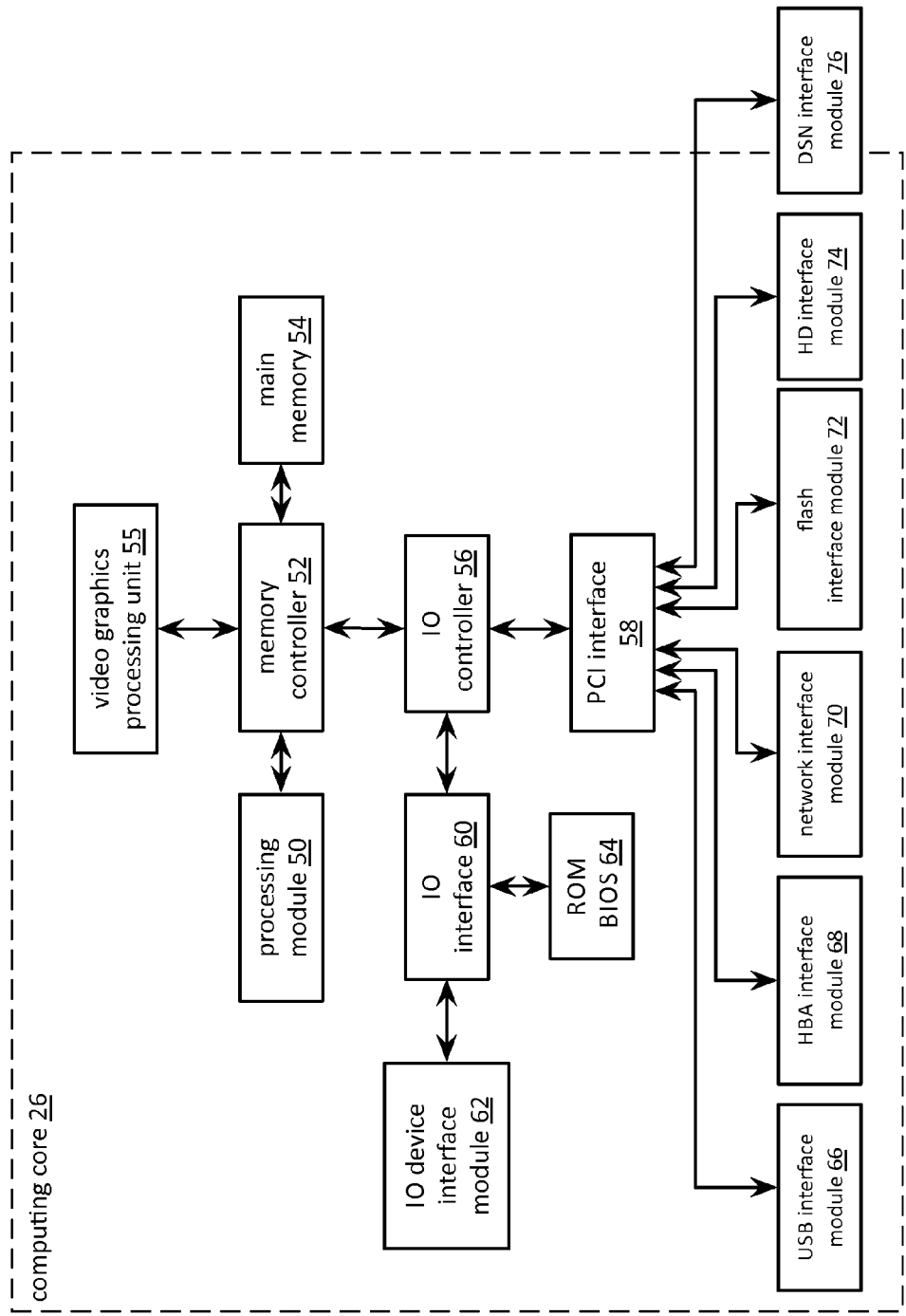
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
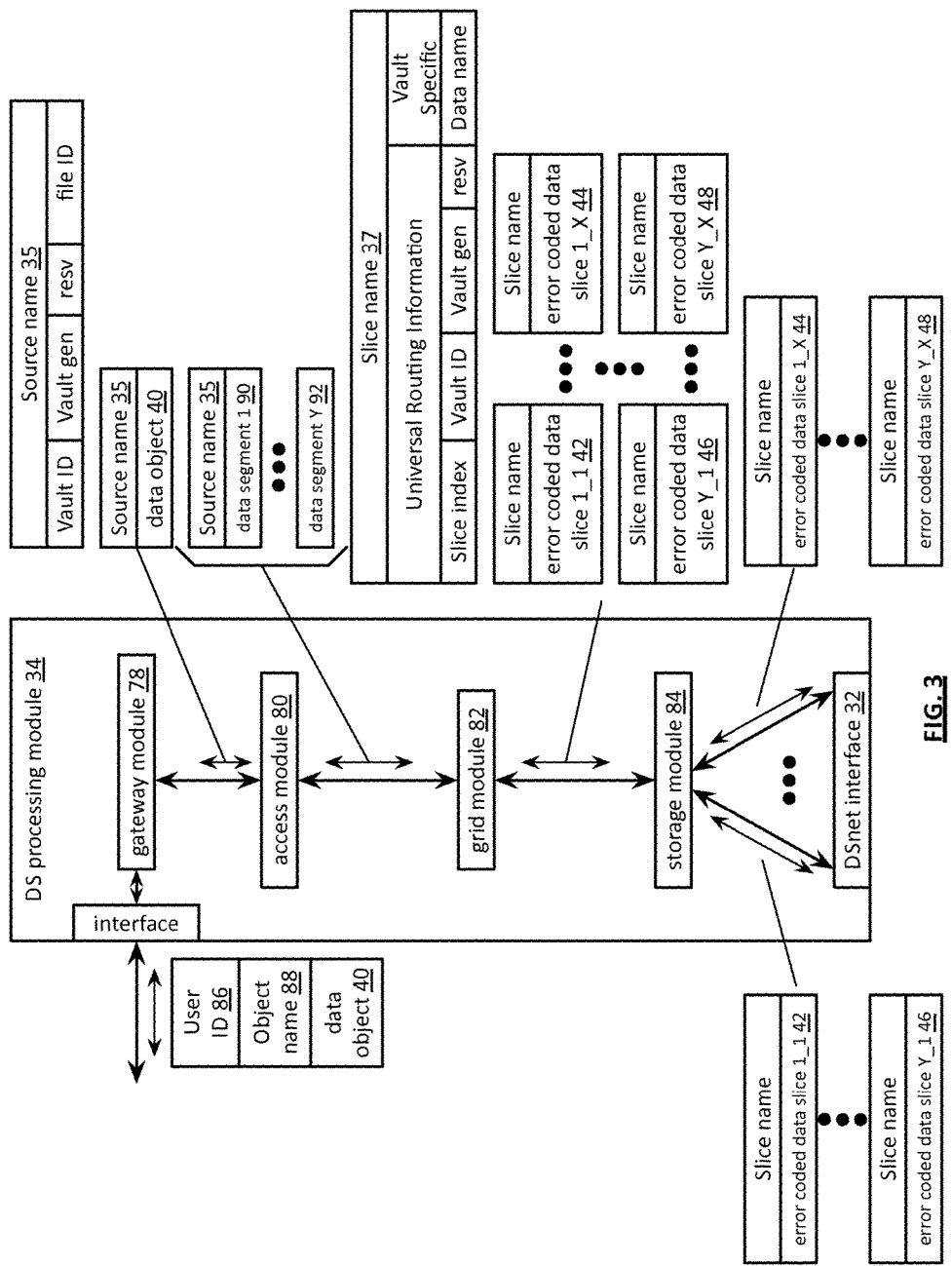
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
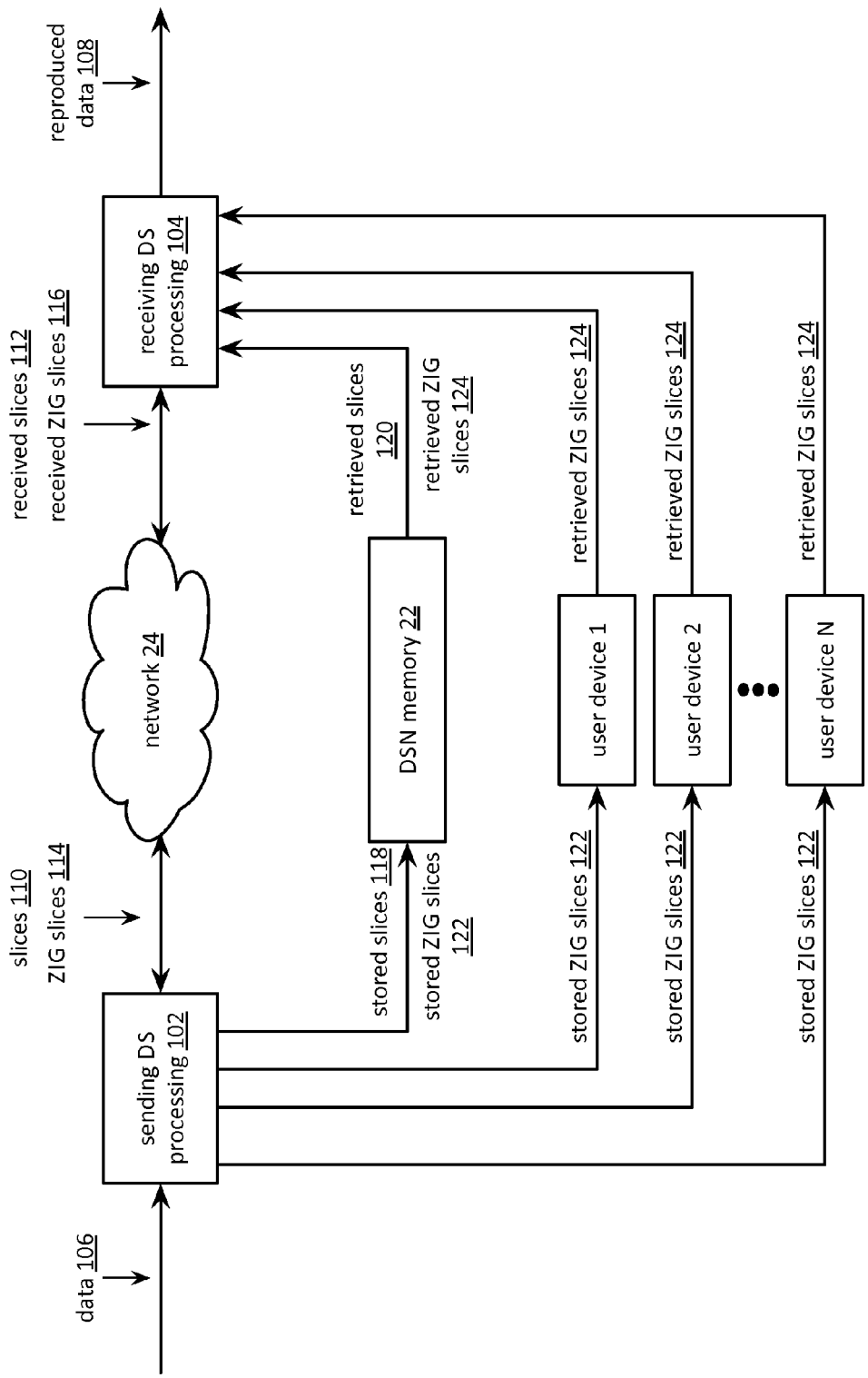
FIG. 6 is another schematic block diagram of an embodiment of a computing system in accordance with the present invention.

FIG. 6 is another schematic block diagram of an embodiment of a computing system that includes a sending dispersed storage (DS) processing 102, a network 24, a dispersed storage network (DSN) memory 22, a receiving DS processing 104, and a plurality of user devices 1-N. The computing system functions include transferring data 106 as encoded data from the sending DS processing 102 to the receiving DS processing 104 and producing reproduced data 108 based on received encoded data. The sending DS processing 102 transforms the data 106 into the encoded data that includes two or more of a slice set 110, a zero information gain (ZIG) slice set 114 (e.g., partial encoded data slices), a stored ZIG slice set 122, and a stored slice set 118. The slice set 110 includes less than a decode threshold number of encoded data slices corresponding to the data 106. The slice set 110 is sent to the receiving DS processing 104. The ZIG slice set 114 includes less than a decode threshold number of ZIG partials (e.g., recovery information) corresponding to at least one encoded data slice of the data 106. The ZIG slice set is sent to the receiving DS processing 104. The stored slice set 118 includes less than a decode threshold number of encoded data slices corresponding to the data 106. The stored slice set 118 is stored in a first memory (e.g., a local memory, the DSN memory 22, one or more DS units). The stored ZIG slice set 122 includes less than a decode threshold number of ZIG slices corresponding to at least one encoded data slice of the data 106. The stored ZIG slice set 122 is stored in a second memory (e.g., a local memory, the DSN memory 22, one or more DS units, and in at least one of the plurality of user devices 1-N).

The sending DS processing 102 transforms the data 106 utilizing a dispersed storage error coding function to produce one or more of the slice set 110, the ZIG slice set 114, the stored ZIG slice set 122, and the stored slice set 118 in accordance with an encoding scheme. The encoding scheme includes one or more of a number of encoded data slices to encode indicator, a number of ZIG slices to encode indicator, one or more encoded data slice identifiers (IDs), one or more ZIG slice IDs, a pillar width n, a decode threshold k, an encoding matrix, a pillar index that identifies a ZIG slice association, a pillar participant list (e.g., other pillars associated with a subsequent decoding of a decode threshold number of ZIG slices to reproduce an encoded data slice), an encryption key, one or more shared secrets, and one or more obfuscation values.

In an example of operation, the sending DS processing 102 dispersed storage error encodes the data 106 in accordance with the encoding scheme to produce less than a decode threshold number of encoded data slices of a set of encoded data slices for inclusion in at least one of the slice set 110 and the stored slice set 118. The sending DS processing 102 encodes at least one other encoded data slice of the set of encoded data slices in accordance with the encoding scheme to produce less than a decode threshold number of ZIG slices, hereafter referred to as ZIG partials or partials, for inclusion in at least one of the ZIG slice set 114 and the stored ZIG slice set 122.

The sending DS processing 102 may combine two or more partial sets to create a new partial set for inclusion as at least one of the ZIG slice set 114 and/or the stored ZIG slice set 122. For example, the sending DS processing 102 utilizes an exclusive OR (XOR) logical function to combine a first partial set and a second partial set to produce a combined partial set. The sending DS processing 102 may obfuscate the partial set (e.g., combined or not) to produce an obfuscated partial set prior to sending or storing the associated partial set. The obfuscation may include one or more of utilizing the XOR logical function, masking, encrypting, appending a constant, and performing a deterministic function. For example, the sending DS processing 102 obfuscates a combined partial set by utilizing the XOR logical function on the combined partial set with an obfuscation value. The obfuscation value may be obtained by at least one of retrieving, performing a lookup, receiving, and utilizing a shared secret value. The shared secret value is shared between the sending DS processing 102 and the receiving DS processing 104.

The sending DS processing 102 sends the slice set 110 and the ZIG slice set 114 via network 24 to the receiving DS processing 104 in accordance with the encoding scheme and/or a partial distribution scheme. The partial distribution scheme includes at least one of a partial set identifier (ID), a transmission destination ID associated with a partial set ID, a storage destination ID associated with a partial set ID, a number of partial sets to distribute, and a number of partial sets to store. Alternatively, or in addition to, the sending DS processing facilitates storing at least one of the stored ZIG slice set 122 and the stored slice set 118 in the DSN memory 22 in accordance with the encoding scheme and/or the partial distribution scheme. Alternatively, or in addition to, the sending DS processing 102 facilitates storing the stored ZIG slice set 122 in one or more user devices of the plurality of user devices 1-N in accordance with the encoding scheme and/or the partial distribution scheme.

The receiving DS processing 104 receives one or more of a received slice set 112 and a received ZIG slice set 116 from the sending DS processing 102 via the network 24 when the sending DS processing 102 sends the slice set 110 and the ZIG slice set 114 corresponding to the received slice set 112 and the received ZIG slice set 116. The receiving DS processing 104 retrieves one or more of a retrieved ZIG slice set 124 and a retrieved slice set 120 from the DSN memory 22 when insufficient encoded data is received directly from the sending DS processing 102 (e.g., producing reproduced data from the received slice set 112 and the received ZIG slice set 116 is not possible). Alternatively, or in addition to, the receiving DS processing 104 retrieves the retrieved ZIG slice set 124 from one or more user devices on the plurality of user devices 1-N. The receiving DS processing 104 transforms one more encoded data slices of one or more slice sets into at least one set of generated partials. The receiving DS processing 104 transforms at least one partial of one or more of the received partial sets and the at least one set of generated partials into at least one recovered encoded data slice. The receiving DS processing 104 decodes the at least one recovered encoded data slice and the received slice set 112 to produce the reproduced data 108. The method of operation of the sending DS processing 102 and the receiving DS processing 104 to transfer data is discussed in greater detail with reference to FIGS. 7A-13.

Figure 7A:
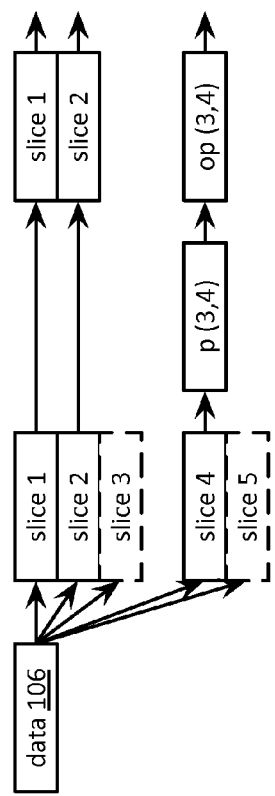
FIG. 7A is a diagram illustrating an example of transforming data into encoded data in accordance with the present invention.

FIG. 7A is a diagram illustrating an example of transforming data 106 into encoded data. Data 106 is dispersed storage error encoded to produce at least a decode threshold number of slices that includes encoded data slices 1, 2, and 4 when a pillar width is 5, a decode threshold is 3, and an encoding scheme indicates to encode slices 1, 2, and 4. Next, a partial p (3,4) is generated for slice 3 based on slice 4 when the encoding scheme indicates to utilize slice 4 to generate a partial for slice 3. The partial p (3,4) is obfuscated to produce an obfuscated partial op (3,4). The obfuscated partial op (3,4) is sent as a less than a decode threshold number of obfuscated partials to at least one receiving entity. Encoded data slices 1 and 2 are sent as less than a decode threshold number of encoded data slices to at least one receiving entity.

Figure 7B:
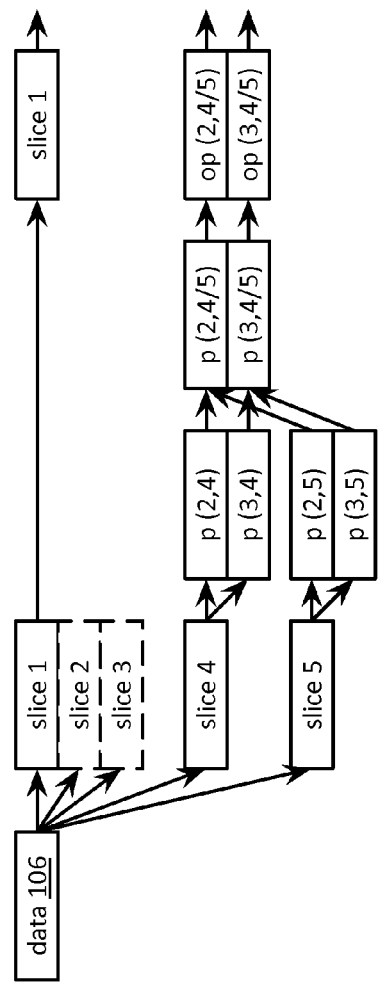
FIG. 7B is a diagram illustrating another example of transforming data into encoded data in accordance with the present invention.

FIG. 7B is a diagram illustrating another example of transforming data 106 into encoded data. Data 106 is dispersed storage error encoded to produce at least a decode threshold number of slices that includes encoded data slices 1, 4, and 5 when a pillar width is 5, a decode threshold is 3, and an encoding scheme indicates to encode slices 1, 4, and 5. Next, partials p (2,4) and p (3,4) are generated for slices 2 and 3 based on slice 4 when the encoding scheme indicates to utilize slice 4 to generate partials for slices 2 and 3. Next, partials p (2,5) and p (3,5) are generated for slices 2 and 3 based on slice 5 when the encoding scheme indicates to utilize slice 5 to generate partials for slices 2 and 3.

Partials p (2,4) and p (2,5) are combined utilizing an exclusive OR (XOR) logical function to produce a combined partial p (2,4/5) when the encoding scheme indicates to combine partials p (2,4) and p (2,5) utilizing the XOR logical function. Partials p (3,4) and p (3,5) are combined utilizing the XOR logical function to produce a combined partial p (3,4/5) when the encoding scheme indicates to combine partials p (3,4) and p (3,5) utilizing the XOR logical function.

The combined partial p (2,4/5) is obfuscated to produce an obfuscated partial op (2,4/5). The combined partial p (3,4/5) is obfuscated to produce an obfuscated partial op (3,4/5). The obfuscated partials op (2,4/5) and op (3,4/5) are sent as to send partials of less than a decode threshold number of obfuscated partials to at least one receiving entity. Encoded data slice 1, but not encoded data slices 4 and 5, is sent as less than a decode threshold number of encoded data slices to at least one receiving entity.

Figure 7C:
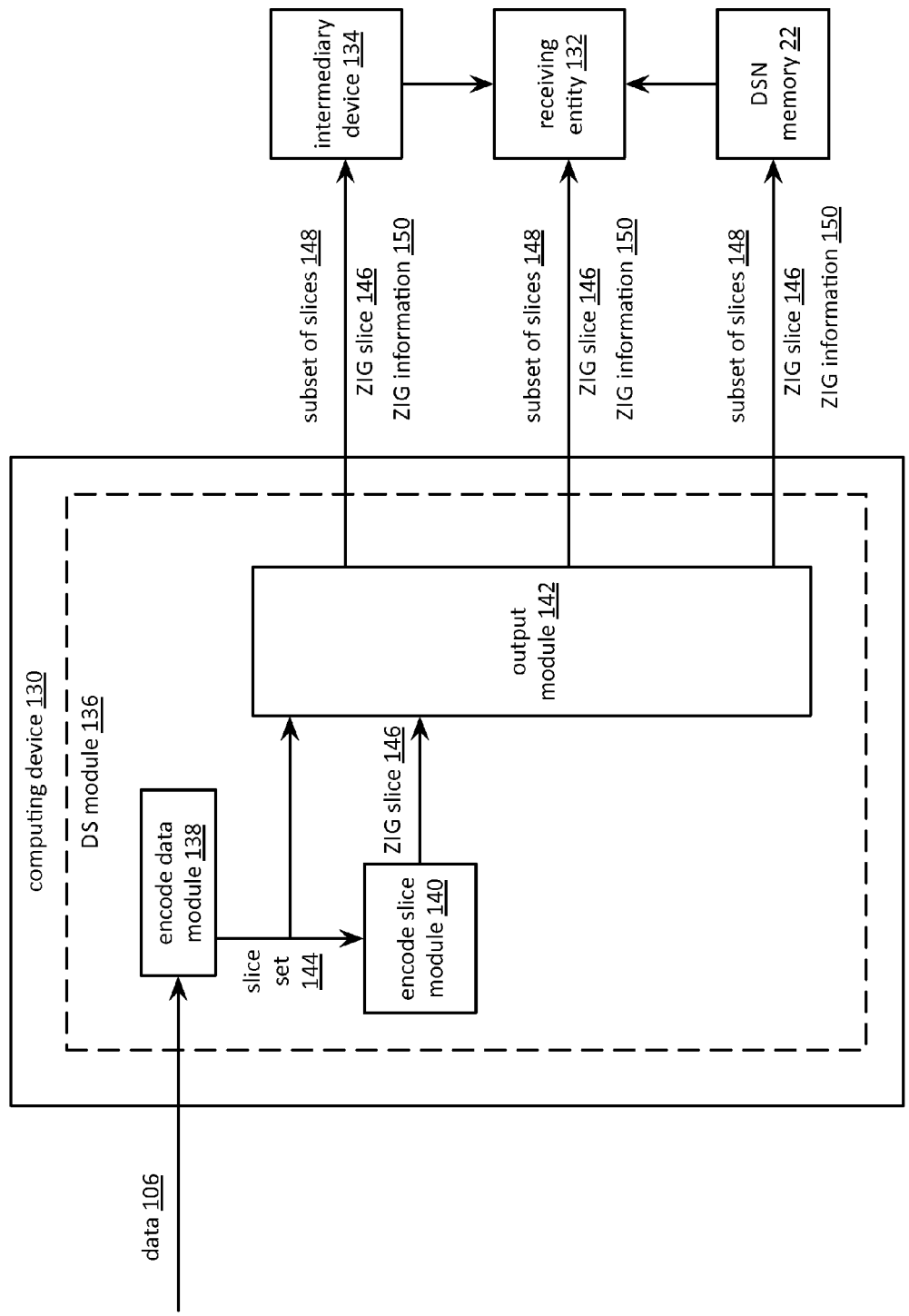
FIG. 7C is another schematic block diagram of an embodiment of a computing system in accordance with the present invention.

FIG. 7C is another schematic block diagram of an embodiment of a computing system that includes a computing device 130, a receiving entity 132, an intermediary device 134, and a dispersed storage network (DSN) memory 22. The receiving entity 132 may be implemented as at least one of a user device, a dispersed storage (DS) processing unit, a DS managing unit, and a DS unit. The intermediary device 134 may be implemented as at least one of a user device, a dispersed storage (DS) processing unit, a DS managing unit, and a DS unit. The computing device 130 may be implemented as at least one of a sending device, a user device, a dispersed storage (DS) processing unit, a DS managing unit, and a DS unit. For example, the computing device 130 is implemented utilizing a user device to send data, the intermediary device 134 is implemented as a second user device affiliated with the computing device 130, and the receiving entity 132 is implemented as a third user device. The computing device 130 includes a DS module 136. The DS module 136 includes an encoding data module 138, an encode slice module 140, and an output module 142.

The encode data module 138 encodes data using a dispersed storage error coding function to produce a set of encoded data slices 144. The data 106 can be recreated from a decode threshold number of encoded data slices of the set of encoded data slices 144. The encode data module 138 functions to encode the data 106 by a series of steps. In a first step, the encode module 138 divides the data into data blocks (e.g., data segments). In a second step, the encode data module 138 encodes the data blocks using an encoding matrix of the dispersed storage error coding function to produce encoded data blocks. For example, the encode data module matrix multiplies a data segment by the encoding matrix to produce a column of a slice matrix. In a third step, the encode data module 138 generates the set of encoded data slices 144 from the encoded data blocks. For example, the encode data module 138 selects a column of the slice matrix to produce the set of encoded data slices 144.

The encode slice module 140 generates a zero information gain (ZIG) encoded data slice that represents a component of recovery information of a first encoded data slice of the set of encoded data slices 144 using a ZIG function and a second encoded data slice of the set of encoded data slices 144. The encode slice module 140 functions to generate the ZIG encoded data slice by a series of steps. In a first step, the encode slice module 140 generates a decoding matrix for the first encoded data slice based on the encoding matrix of the dispersed storage error coding function. The generating includes obtaining the encoding matrix utilized to generate the set of encoded data slices, reducing the encoding matrix to produce a square matrix that exclusively includes rows associated with the first encoded data slice and a subset of encoded data slices 148, and inverting the square matrix to produce the decoding matrix. In a second step, the encode slice module 140 generates the ZIG encoded data slice 146 based on the decoding matrix and on the second encoded data slice. The generating includes encoding the second encoded data slice using the decoding matrix to produce a vector (e.g., matrix multiplying the decoding matrix by the second encoded data slice to produce the vector) and matrix multiplying the vector by a row of the encoding matrix corresponding to the first encoded data slice to produce the ZIG encoded data slice 146.

The output module 142 outputs the ZIG encoded data slice 146 and the subset of encoded data slices 148 of the set of encoded data slices 146. The subset of encoded data slices 148 includes less than the decode threshold number of encoded data slices and does not include the first or the second encoded data slice. The outputting includes selecting the subset of encoded data slices 148 based on one or more of a security requirement (e.g., requirement not to expose a slice generated from a unity matrix of an encoding matrix), a reliability requirement (e.g., choose decode threshold number compatible with network error rate to the receiving entity), a network bandwidth availability indicator, (e.g., may minimize number of selected slices when bandwidth to the receiving entity is low), a DSN memory availability indicator, a dispersed storage (DS) unit availability indicator, a user device availability indicator, and a predetermination.

The output module 142 functions to output the ZIG encoded data slice 146 and the subset of encoded data slices 148 by at least one of outputting to the receiving entity 132 in support of a communication with the receiving entity 132 (e.g., via a network), outputting to the DSN memory 22 for storage therein (e.g., generate write slice requests, output the requests), and outputting to at least one intermediary device 134 (e.g., in accordance with a predetermined list of user devices implemented as intermediary devices). The output module 142 further functions to output by obfuscating the ZIG encoded data slice 146 utilizing an obfuscation function prior to outputting the ZIG encoded data slice 146. The obfuscation function includes at least one of an exclusive OR function with a shared secret of the receiving entity 132 and an encrypting function utilizing at least one of a shared key and a public key associated with a public-private key pair of the receiving entity 132.

The output module 142 further functions to output ZIG function information 150 regarding the encoding of the first encoded data slice. The ZIG function information 150 includes one or more of the encoding matrix of the dispersed storage error coding function, an inverted square matrix based on the encoding matrix and corresponding to the first encoded data slice, and pillar identifiers (IDs) corresponding to the subset of encoded data slices. The outputting includes one or more of sending the ZIG information 150 to the receiving entity 132, sending the ZIG information 150 to the intermediary device 134, and facilitating storage of the ZIG information in the DSN memory 22.

The system may produce more than one ZIG encoded data slices 146 based on more than one encoded data slice of the set of encoded data slices 144. When producing more than one ZIG encoded data slice 146, the encode slice module 140 generates a second ZIG encoded data slice 146 that represents a component of recovery information of a third encoded data slice of the set of encoded data slices 144 using the ZIG function and the second encoded data slice or a fourth encoded data slice of the set of encoded data slices 144. The generating is based on the second encoded data slice when at least two ZIG encoded data slices are required for a common encoded data slice (e.g., the second encoded data slice). The encoding is based on the fourth encoded data slice when another ZIG encoded data slice is required for another encoded data slice (e.g., the fourth encoded data slice). The output module 142 outputs the ZIG encoded data slice 146, the second ZIG encoded data slice of 46, and the subset of encoded data slices 148 of the set of encoded data slices 144. When producing more than one ZIG encoded data slice 146, the subset of encoded data slices 148 includes less than the decode threshold number of encoded data slices and does not include the first, second, or third encoded data slice and, when the third encoded data slice is encoded based on the fourth encoded data slice, the subset of encoded data slices further does not include the fourth encoded data slice.

The system may produce two or more ZIG encoded data slices 146 based on a common encoded data slice of the set of encoded data slices 144. When producing two or more ZIG encoded data slices 146 based on a common encoded data slice, the encode slice module 140 generates a second ZIG encoded data slice that represents a second component of the recovery information of the first encoded data slice of the set of encoded data slices using the ZIG function and a third encoded data slice of the set of encoded data slices. Next, the encode slice module 140 combines (e.g., exclusive OR) the second ZIG encoded data slice 146 with the ZIG encode data slice 146 to produce the ZIG encoded data slice 146. Next, the output module 142 outputs the ZIG encoded data slice 146 and the subset of encoded data slices 148 of the set of encoded data slices 144. The subset of encoded data slices 148 includes less than the decode threshold number of encoded data slices and does not include the first, second, or third encoded data slice when encoding the common encoded data slice.

Figure 7D:
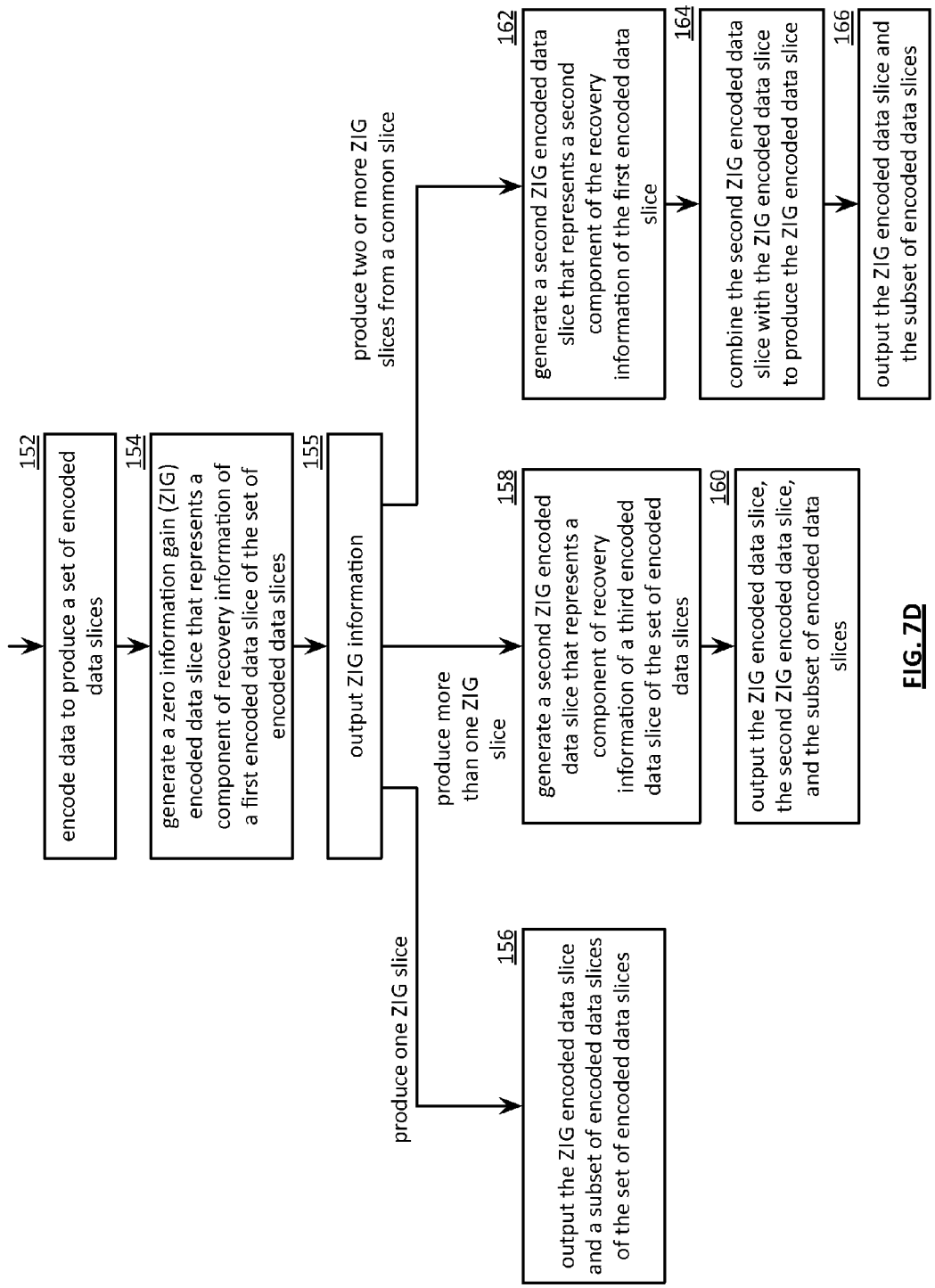
FIG. 7D is a flowchart illustrating an example of sending data in accordance with the present invention.

FIG. 7D is a flowchart illustrating an example of sending data. The method begins at step 152 were a processing module (e.g., of a dispersed storage (DS) processing module) encodes data using a dispersed storage error coding function to produce a set of encoded data slices. The data can be recreated from a decode threshold number of encoded data slices of the set of encoded data slices. The encoding the data includes dividing the data into data blocks, encoding the data blocks using an encoding matrix of the dispersed storage error coding function to produce encoded data blocks, and generating the set of encoded data slices from the encoded data blocks.

The method continues at step 154 where the processing module generates a zero information gain (ZIG) encoded data slice that represents a component of recovery information of a first encoded data slice of the set of encoded data slices using a ZIG function and a second encoded data slice of the set of encoded data slices. The generating the ZIG encoded data slice includes a sequence of steps. In a first step, the processor module generates a decoding matrix for the first encoded data slice based on an encoding matrix of the dispersed storage error coding function. The generating includes obtaining the encoding matrix utilized to generate the set of encoded data slices, reducing the encoding matrix to produce a square matrix that exclusively includes rows associated with the first encoded data slice and a subset of encoded data slices, and inverting the square matrix to produce the decoding matrix. In a second step, processing module generates the ZIG encoded data slice based on the decoding matrix and on the second encoded data slice. The generating includes encoding the second encoded data slice using the decoding matrix to produce a vector (e.g., matrix multiplying the decoding matrix by the second encoded data slice to produce the vector) and matrix multiplying the vector by a row of the decoding matrix corresponding to the first encoded data slice to produce the ZIG encoded data slice.

In an example of generating the ZIG encoded data slice, the processing module generates a ZIG encoded data slice for encoded data slice 1 from encoded data slice 2, denoted p(1,2), when a pillar index includes slice 1, slice 2 is one of a decode threshold number of participant encoded data slices, slice 1 is not one of the participant encoded data slices, and the participant encoded data slice pillars includes pillars 2-4. For instance, the processing module generates the ZIG encoded data slice p (1,2) in accordance with a function: partial (1,2)=(inverted square matrix of an encoding matrix rows 2,3,4)*(data matrix with slice 2 in row 1)*(row 1 of the encoding matrix), when a pillar width is 5, a decode threshold is 3.

The method continues at step 155 where the processing module outputs ZIG function information regarding the encoding of the first encoded data slice. The outputting includes outputting to at least one of a receiving entity, an intermediary device, and a dispersed storage network (DSN) memory.

The system may produce more than one ZIG encoded data slice in accordance with an encoding approach. The system may produce two or more ZIG encoded data slices in accordance with the encoding approach based on a common encoded data slice of the set of encoded data slices. The encoding approach includes one or more of a number of ZIG encoded data slices to encode, a number of ZIG encoded data slices per common encoded data slice to encode, a decode threshold number, the encoding matrix, and a pillar width number. The processing module may obtain the encoding approach based on at least one of a lookup, and predetermination, receiving, and calculating based on one or more of a security requirement, a reliability requirement, and a performance requirement. The method branches to step 158 when producing more than one ZIG encoded data slice. The method branches to step 162 when utilizing the common encoded data slice. The method continues to step 156 when producing one ZIG encoded data slice.

When producing one ZIG encoded data slice, the method continues at step 156 where the processing module outputs the ZIG encoded data slice and the subset of encoded data slices of the set of encoded data slices. The subset of encoded data slices includes less than the decode threshold number of encoded data slices and does not include the first or the second encoded data slice. The outputting includes selecting the subset of encoded data slices is based on one or more of a security requirement (e.g., requirement not to expose a slice generated from a unity matrix of an encoding matrix), a reliability requirement (e.g., choose decode threshold number compatible with network error rate to the receiving entity), a network bandwidth availability indicator, (e.g., may minimize number of selected slices when bandwidth to the receiving entity is low), a dispersed storage network (DSN) memory availability indicator, a dispersed storage (DS) unit availability indicator, a user device availability indicator, and a predetermination. The outputting further includes obfuscating the ZIG encoded data slice utilizing an obfuscation function (e.g., exclusive OR), prior to outputting the ZIG encoded data slice.

The outputting the ZIG encoded data slice and the subset of encoded data slices includes at least one of a variety of approaches. In a first approach, the processing module outputs to a receiving entity in support of a communication with the receiving entity. In a second approach, the processing module outputs to a dispersed storage network (DSN) memory for storage therein. For example, the processing module generates a write slice request for the ZIG encoded data slice that includes the ZIG encoded data slice. For each encoded data slice of the subset of encoded data slices, the processing module generates a write slice request that includes the encoded data slice of the subset of encoded data slices. Next, the processing module outputs the write slice request associated with the ZIG encoded data to the DSN memory. For each encoded data slice of the subset of encoded data slices, the processing module outputs a corresponding write slice request to the DSN memory. In a third approach, the processing module outputs to at least one intermediary device.

When producing more than one ZIG encoded data slice, the method continues at step 158 where the processing module generates a second ZIG encoded data slice that represents a component of recovery information of a third encoded data slice of the set of encoded data slices using the ZIG function and the second encoded data slice or a fourth encoded data slice of the set of encoded data slices. The method continues at step 160 where the processing module outputs the ZIG encoded data slice, the second ZIG encoded data slice, and the subset of encoded data slices of the set of encoded data slices. The subset of encoded data slices includes less than the decode threshold number of encoded data slices and does not include the first, second, or third encoded data slice and, when the third encoded data slice is encoded based on the fourth encoded data slice, the subset of encoded data slices further does not include the fourth encoded data slice.

When producing two or more ZIG encoded data slices utilizing the common encoded data slice, the method continues at step 162 where the processing module generates a second ZIG encoded data slice that represents a second component of the recovery information of the first encoded data slice of the set of encoded data slices using the ZIG function and a third encoded data slice of the set of encoded data slices. The method continues at step 164 where the processing module combines (e.g., exclusive OR) the second ZIG encoded data slice with the ZIG encode data slice to produce the ZIG encoded data slice. The method continues at step 166 where the processing module outputs the ZIG encoded data slice and the subset of encoded data slices of the set of encoded data slices. The subset of encoded data slices includes less than the decode threshold number of encoded data slices and does not include the first, second, or third encoded data slice.

Figure 8A:
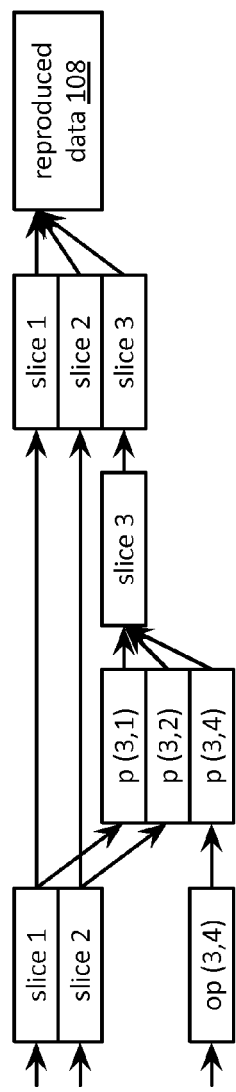
FIG. 8A is a diagram illustrating an example of transforming encoded data into data in accordance with the present invention.

FIG. 8A is a diagram illustrating an example of transforming encoded data into reproduced data 108. Encoded data slices 1 and 2 are received as less than a decode threshold number of slices to produce received encoded data slices. Obfuscated partial op (3,4) is received as less than a decode threshold number of partials to produce received partials. Partial p (3,1) is generated from received encoded data slice 1 and partial p (3,2) is generated from received encoded data slice 2. Received partial op (3,4) is de-obfuscated to produce received partial p (3,4). Generated partials p (3,1) and p (3,2) are combined with received partial p (3,4) to produce recovered encoded data slice 3. Recovered encoded data slice 3 is dispersed storage error decoded along with received encoded data slices 1 and 2 to produce reproduced data 108.

Figure 8B:
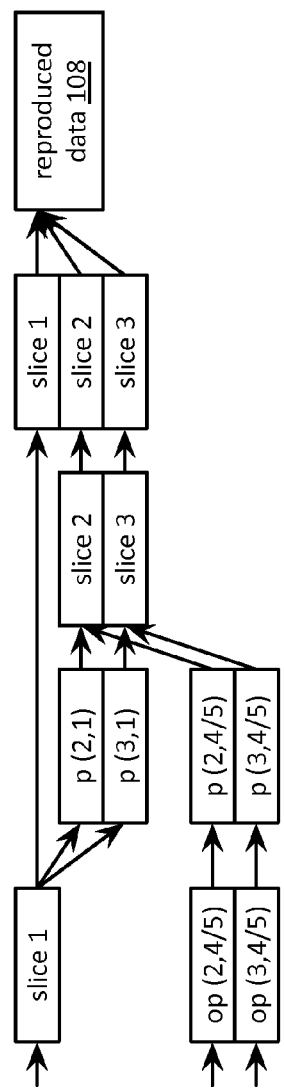
FIG. 8B is a diagram illustrating another example of transforming encoded data into data in accordance with the present invention.

FIG. 8B is a diagram illustrating another example of transforming encoded data into reproduced data 108.

Encoded data slice 1 is received as a less than a decode threshold number of slices to produce a received encoded data slice 1. Obfuscated partial op (2,4/5) is received as less than a decode threshold number of partials to produce a received partial op (2,4/5). Obfuscated partial op (3,4/5) is received as less than a decode threshold number of partials to produce a received partial op (3,4/5). Partials p (2,1) and p (3,1) are generated from received encoded data slice 1. Received partial op (2,4/5) is de-obfuscated to produce received partial p (2,4/5). Received partial op (3,4/5) is de-obfuscated to produce received partial p (3,4/5). Generated partial p (2,1) is combined with received partial p (2,4/5) to produce recovered encoded data slice 2. Generated partial p (3,1) is combined with received partial p (3,4/5) to produce recovered encoded data slice 3. Recovered encoded data slices 2 and 3 are dispersed storage error decoded along with received encoded data slice 1 to produce reproduced data 108.

Figure 8C:
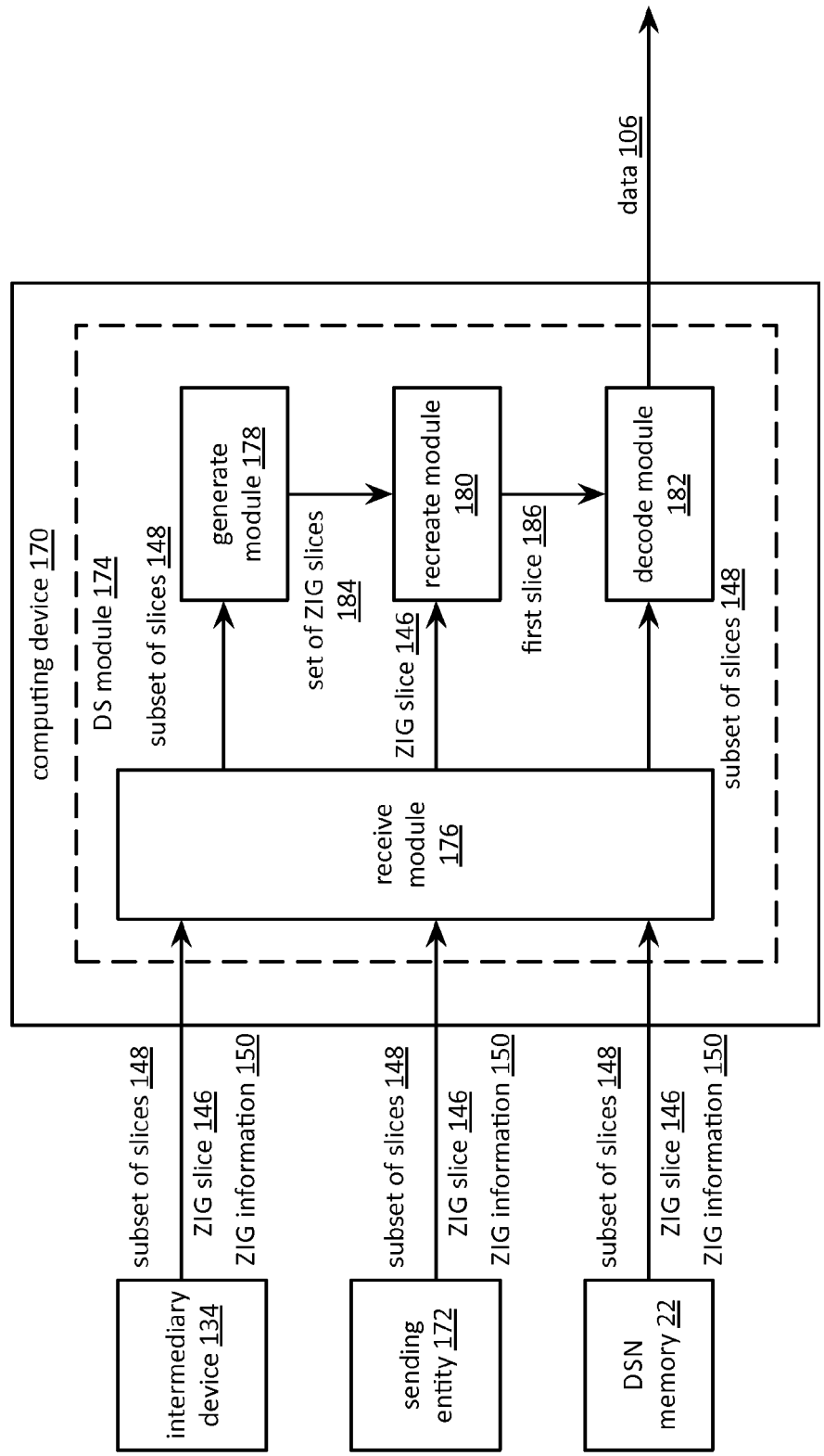
FIG. 8C is another schematic block diagram of an embodiment of a computing system in accordance with the present invention.

FIG. 8C is another schematic block diagram of an embodiment of a computing system that includes a computing device 170, a sending entity 172, an intermediary device 134, and a dispersed storage network (DSN) memory 22. The sending entity 172 may be implemented as at least one of a user device, a dispersed storage (DS) processing unit, a DS managing unit, and a DS unit. The intermediary device 134 may be implemented as at least one of a user device, a dispersed storage (DS) processing unit, a DS managing unit, and a DS unit. The computing device 170 may be implemented as at least one of a receiving entity, a user device, a dispersed storage (DS) processing unit, a DS managing unit, and a DS unit. For example, the sending entity 172 is implemented utilizing a user device to send data, the intermediary device 134 is implemented as a second user device affiliated with the computing device 170, and the computing device 170 is implemented as a third user device. The computing device 170 includes a DS module 174. The DS module 174 includes a receive module 176, a generate module 178, a recreate module 180, and a decode module 182.

The receive module 176 receives a zero information gain (ZIG) encoded data slice 146 and a subset of encoded data slices 148 of a set of encoded data slices. Data 106 was encoded using a dispersed storage error coding function to produce the set of encoded data slices. Data 106 can be recreated from a decode threshold number of encoded data slices of the set of encoded data slices. The subset of encoded data slices 148 includes less than the decode threshold number of encoded data slices and does not include a first or a second encoded data slice of the set of encoded data slices. The ZIG encoded data slice 146 represents a first component of recovery information of the first encoded data slice 186 that is based on the second encoded data slice. The receive module 176 may obtain ZIG function information 150 regarding the generating of the ZIG encoded data slice 146. The receive module 176 receives the ZIG encoded data slice 146, the subset of encoded data slices 148, and the ZIG function information 150 from one or more of the intermediary device 134 (e.g., in response to a request), the sending entity 172, and the DSN memory 22 (e.g., in response to a request).

The generate module 178 generates a set of ZIG encoded data slices 184 using a ZIG function and corresponding ones of the subset of encoded data slices 148. The set of ZIG encoded data slices 184 represents additional components of the recovery information of the first encoded data slice 186. The generate module 178 functions to generate one of the set of ZIG encoded data slices 184 by generating a decoding matrix for the first encoded data slice 186 based on an encoding matrix of the dispersed storage error coding function and generating the one of the set of ZIG encoded data slices 184 based on the decoding matrix and on a corresponding one of the subset of encoded data slices 148. The generate module 178 functions to generate the decoding matrix by reducing the encoding matrix to produce a square matrix based on the first encoded data slice 186 and the subset of encoded data slices 148 (e.g., square matrix includes rows associated with the first encoded data slice 186 and the subset of encoded data slices) and inverting the square matrix to produce the decoding matrix.

The generate module 178 functions to generate the one of the set of ZIG encoded data slices 184 based on the decoding matrix by encoding the corresponding one of the subset of encoded data slices 148 using the decoding matrix to produce a vector (e.g., matrix multiplying the decoding matrix by the corresponding one of the subset of encoded data slices 148 to produce the vector) and encoding the vector by a row of the decoding matrix corresponding to the first encoded data slice 186 to produce the one of the set of ZIG encoded data slices 184 (e.g., matrix multiplying the vector by a row of the decoding matrix corresponding to the first encoded data slice 186 to produce the one of the set of ZIG encoded data slices 184).

The recreate module 180 recreates the first encoded data slice 186 from the ZIG encoded data slice 146 and the set of ZIG encoded data slices 184. Prior to recreating the first encoded data slice 186, the recreate module 180 functions to de-obfuscate the ZIG encoded data slice 146 utilizing an obfuscation function when the ZIG encoded data slice 146 was obfuscated. For example, the recreate module 180 performs an exclusive OR function on the ZIG encoded data slice 146 with a shared secret to de-obfuscate the ZIG encoded data slice 146. The shared secret includes at least one of a private key, a secret value shared with the sending entity 172, a shared secret value of the ZIG information 150.

The recreate module 180 recreates the first encoded data slice 186 from the ZIG encoded data slice 146 and the set of ZIG encoded data slices 184 by one of a variety of approaches. In a first approach, the recreate module 180 exclusive ORs the ZIG encoded data slice 146 and the set of ZIG encoded data slices 184 to produce the first encoded data slice 186. In a second approach, the recreate module 180 rebuilds the first encoded data slice 186 based on the ZIG encoded data slice 146 and the set of ZIG encoded data slices 184 in accordance with a dispersed storage error coding function.

The decode module 182 decodes the subset of encoded data slices 148 and the first encoded data slice 186 using the dispersed storage error coding function to reproduce the data 106. The decode module 182 decodes the subset of encoded data slices 148 and the first encoded data slice 186 by a series of steps. In a first step, the decode module 182 generates a received slice matrix from the first encoded data slice 186 and the subset of encoded data slices 148 (e.g., the received slice matrix includes decode threshold number of rows). In a second step, the decode module 182 generates a data matrix based on the received slice matrix and a decoding matrix. The generating includes matrix multiplying the received slice matrix by the decoding matrix to produce the data matrix. In a third step, the decode module 182 creates the data 106 from the data matrix. The creating includes aggregating the data matrix to form the data 106. The decode module 182 may generate the decoding matrix by a series of steps. In a first step, the decode module 182 obtains an encoding matrix utilized to generate the set of encoded data slices (e.g., receives ZIG information 150). In a second step, the decode module 182 reduces the encoding matrix based on rows associated with the subset of encoded data slices 148 and the first encoded data slice 186 to produce a square matrix. In a third step, the decode module 182 converts the square matrix to produce the decoding matrix.

Figure 8D:
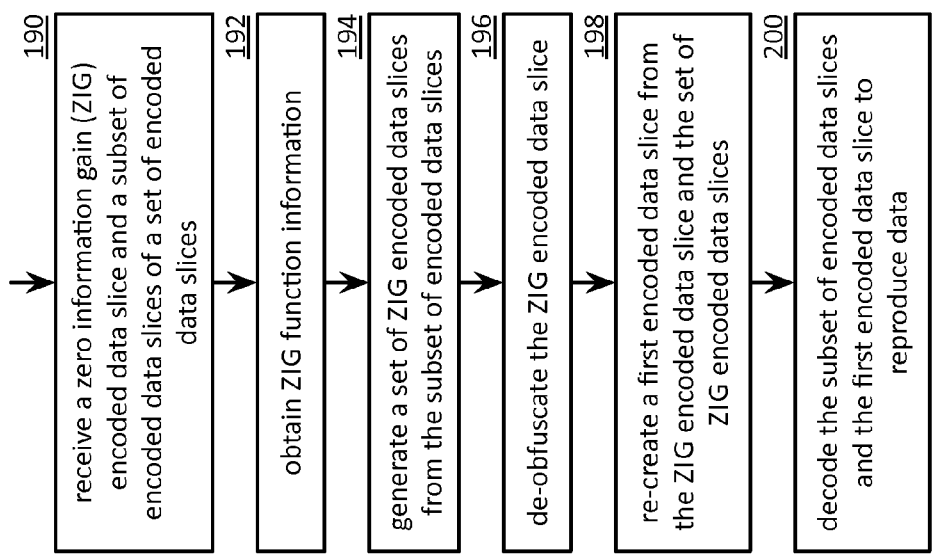
FIG. 8D is a flowchart illustrating an example of receiving data in accordance with the present invention.

FIG. 8D is a flowchart illustrating an example of receiving data. The method begins at step 190 where a processing module (e.g., of a receiving entity) receives a zero information gain (ZIG) encoded data slice and a subset of encoded data slices of a set of encoded data slices. Data was encoded using a dispersed storage error coding function to produce the set of encoded data slices. The data can be recreated from a decode threshold number of encoded data slices of the set of encoded data slices. The subset of encoded data slices includes less than the decode threshold number of encoded data slices and does not include a first or a second encoded data slice of the set of encoded data slices. The ZIG encoded data slices represents a first component of recovery information of the first encoded data slice that is based on the second encoded data slice.

The method continues at step 192 where the processing module obtains ZIG function information regarding the generating of the ZIG encoded data slice. The obtaining includes at least one of receiving the ZIG function information with the ZIG encoded data slice, retrieving the ZIG function information from a dispersed storage network (DSN) memory, and receiving the ZIG function information from an intermediary device in response to a request.

The method continues at step 194 where the processing module generates a set of ZIG encoded data slices using a ZIG function and corresponding ones of the subset of encoded data slices. The set of ZIG encoded data slices represents additional components of the recovery information of the first encoded data slice. The generating one of the set of ZIG encoded data slices includes generating a decoding matrix for the first encoded data slice based on an encoding matrix of the dispersed storage error coding function and generating the one of the set of ZIG encoded data slices based on the decoding matrix and on a corresponding one of the subset of encoded data slices. The generating the decoding matrix includes reducing the encoding matrix to produce a square matrix based on the first encoded data slice and the subset of encoded data slices (e.g., exclusively includes rows associated with the first encoded data slice and the subset of encoded data slices) and inverting the square matrix to produce the decoding matrix.

The generating the one of the set of ZIG encoded data slices based on the decoding matrix includes encoding the corresponding one of the subset of encoded data slices using the decoding matrix to produce a vector (e.g., matrix multiplying the decoding matrix by the corresponding one of the subset of encoded data slices to produce the vector) and encoding the vector by a row of the decoding matrix corresponding to the first encoded data slice to produce the one of the set of ZIG encoded data slices. The encoding includes matrix multiplying the vector by a row of the decoding matrix corresponding to the first encoded data slice to produce the one of the set of ZIG encoded data slices.

Prior to recreating the first encoded data slice, the method continues at step 196 where the processing module de-obfuscates the ZIG encoded data slice utilizing an obfuscation function when the first encoded data slice was obfuscated. For example, the processing module will performs an exclusive OR (XOR) function on the ZIG encoded data slice with a shared secret to de-obfuscate the ZIG encoded data slice. The shared secret includes at least one of a private key, a secret value shared with a sending entity, a shared secret value of the ZIG information. As another example, the processing module de-obfuscates the ZIG encoded data slice by utilizing the XOR function on the ZIG encoded data slice and with a corresponding obfuscation value (e.g., a pillar number).

The method continues at step 198 where the processing module recreates the first encoded data slice from the ZIG encoded data slice and the set of ZIG encoded data slices. The recreating the first encoded data slice from the ZIG encoded data slice and the set of ZIG encoded data slices includes one of a variety of approaches. A first approach includes exclusive ORing the ZIG encoded data slice and the set of ZIG encoded data slices to produce the first encoded data slice. A second approach includes rebuilding the first encoded data slice based on the ZIG encoded data slice and the set of ZIG encoded data slices in accordance with a dispersed storage error coding function.

The method continues at step 200 and processing module decodes the subset of encoded data slices and the first encoded data slice using the dispersed storage error coding function to reproduce the data. The decoding the subset of encoded data slices and the first encoded data slice includes a series of steps. A first step includes generating a received slice matrix from first encoded data slice and the subset of encoded data slices (e.g., the received slice matrix includes decode threshold number of rows). A second step includes generating a data matrix based on the received slice matrix and a decoding matrix. The generating includes matrix multiplying the received slice matrix by the decoding matrix to produce the data matrix. A third step includes creating the data from the data matrix. The creating includes aggregating the data matrix to form the data. The processing module may produce the decoding matrix by a series of steps. A first step includes obtaining an encoding matrix utilized to generate the set of encoded data slices. A second step includes reducing the encoding matrix based on rows associated with the subset of encoded data slices and the first encoded data slice to produce a square matrix. A third step includes inverting the square matrix to produce the decoding matrix.

FIG. 9A is a diagram illustrating an example of generation of a set of zero information gain (ZIG) encoded data slices to facilitate sending an encoded data slice (e.g., slice 1) from a sending entity to a receiving entity. The sending includes a series of steps. A first step includes determining whether to send an encoded data slice of a set of encoded data slices in accordance with a ZIG format. Data (e.g., a data segment) is encoded (e.g., by the sending entity) using a dispersed storage error coding function to produce the set of encoded data slices. The data can be recreated (e.g., by the receiving entity) from a decode threshold number of encoded data slices of the set of encoded data slices. For example, sending entity receives an error message from the receiving entity indicating that encoded data slice 1 is missing with regards to a previous slice transfer. The sending entity determines to send encoded data slice 1 in accordance with the ZIG format based on the error message.

When sending the encoded data slice in accordance with the ZIG format, a second step includes selecting a partial encoding threshold number of encoded data slices of the set of encoded data slices. The partial encoding threshold number may be substantially the same as the decode threshold number of the dispersed storage error coding function. The selection results in the partial encoding threshold number of encoded data slices such that the partial encoding threshold number of encoded data slices does not include the encoded data slice. For example, the sending entity selects encoded data slices 2-4 of the set of encoded data slices 1-5.

A third step includes generating a set of ZIG encoded data slices based on a ZIG function and the partial encoding threshold number of encoded data slices. The set of ZIG encoded data slices represents recovery information of the encoded data slice (e.g., the receiving entity recreates encoded data slice 1 based on the set of ZIG encoded data slices. For example, the sending entity generates the set of ZIG encoded data slices by generating partial p (1,2) (e.g., a ZIG encoded data slice that represents a portion of recovery information of encoded data slice 1) based on encoded data slice 2 for missing encoded data slice 1, generates partial p (1,3) based on encoded data slice 3 for missing encoded data slice 1, and generates partial p (1,4) based on encoded data slice 4 for missing encoded data slice 1. The generating may include obfuscating one or more of the ZIG encoded data slices. For example, the sending entity obfuscates partials p (1,2), p (1,3), and p (1,4) prior to outputting to produce obfuscated partials op (1,2), op (1,3), and op (1,4).

A fourth step includes outputting the set of ZIG encoded data slices to the receiving entity. The outputting may include utilizing one or more communication paths and/or one or more intermediary devices that includes temporary storage. For example, the sending entity outputs obfuscated partials op (1,2), op (1,3), and op (1,4) to the receiving entity. The receiving entity receives the partial encoding threshold number of obfuscated partials op (1,2), op (1,3), and op (1,4). The receiving entity de-obfuscates obfuscated partials op (1,2), op (1,3), and op (1,4) to reproduce partials p (1,2), p (1,3), and p (1,4). The receiving entity combines partials p (1,2), p (1,3), and p (1,4) to reproduce missing encoded data slice 1. For instance, the receiving entity performs the exclusive OR function on partials p (1,2), p (1,3), and p (1,4) to reproduce missing encoded data slice 1.

FIG. 9B is a diagram illustrating another example of generation of a set of zero information gain (ZIG) encoded data slices to facilitate sending an encoded data slice (e.g., slice 1) from a sending entity to a receiving entity. The sending includes a series of steps. A first step includes determining whether to send an encoded data slice of a set of encoded data slices in accordance with a ZIG format. Data (e.g., a data segment) is encoded (e.g., by the sending entity) using a dispersed storage error coding function to produce the set of encoded data slices. The data can be recreated (e.g., by the receiving entity) from a decode threshold number of encoded data slices of the set of encoded data slices. For example, sending entity receives a security message from a managing entity indicating that encoded data slice 1 shall be transferred utilizing the ZIG format. The sending entity determines to send encoded data slice 1 in accordance with the ZIG format based on the security message.

When sending the encoded data slice in accordance with the ZIG format, a second step includes selecting a partial encoding threshold number of encoded data slices of the set of encoded data slices. The partial encoding threshold number may be substantially the same as the decode threshold number of the dispersed storage error coding function. The selection results in the partial encoding threshold number of encoded data slices such that the partial encoding threshold number of encoded data slices does not include the encoded data slice. For example, the sending entity selects encoded data slices 2-4 of the set of encoded data slices 1-5.

A third step includes generating a set of ZIG encoded data slices based on a ZIG function and the partial encoding threshold number of encoded data slices. The set of ZIG encoded data slices represents recovery information of the encoded data slice (e.g., the receiving entity recreates encoded data slice 1 based on the set of ZIG encoded data slices. For example, the sending entity generates the set of ZIG encoded data slices by generating partial p (1,2) (e.g., a ZIG encoded data slice that represents a portion of recovery information of encoded data slice 1) based on encoded data slice 2 for missing encoded data slice 1, generates partial p (1,3) based on encoded data slice 3 for missing encoded data slice 1, and generates partial p (1,4) based on encoded data slice 4 for missing encoded data slice 1.

A fourth step includes combining two or more ZIG encoded data slices of the set of ZIG encoded data slices. For example, the sending entity combines partial p(1,3) with partial p(1,4) utilizing an exclusive OR function to produce partial p(1,3/4). The combining may include obfuscating one or more of the ZIG encoded data slices prior to outputting. For example, the sending entity obfuscates partials p (1,2) and p (1,3/4) prior to outputting to produce obfuscated partials op (1,2) and op (1,3/4).

A fifth step includes outputting the set of ZIG encoded data slices to the receiving entity. The outputting includes utilizing two or more communication paths and/or intermediary devices that includes temporary storage. Utilizing two or more paths may provide one or more of a network bandwidth utilization improvement and a security improvement to the system. For example, the sending entity outputs obfuscated partial op (1,2) via a first communication path to the receiving entity and outputs obfuscated partial op (1,3/4) via a second communication path. The receiving entity receives obfuscated partials op (1,2) and op (1,3/4). The receiving entity de-obfuscates obfuscated partials op (1,2) and op (1,3/4) to reproduce partials p (1,2) and p (1,3/4). The receiving entity combines partials p (1,2) and p (1,3/4) to reproduce missing encoded data slice 1. For instance, the receiving entity performs the exclusive OR function on partials p (1,2) and p (1,3/4) to reproduce missing encoded data slice 1.

Figure 9C:
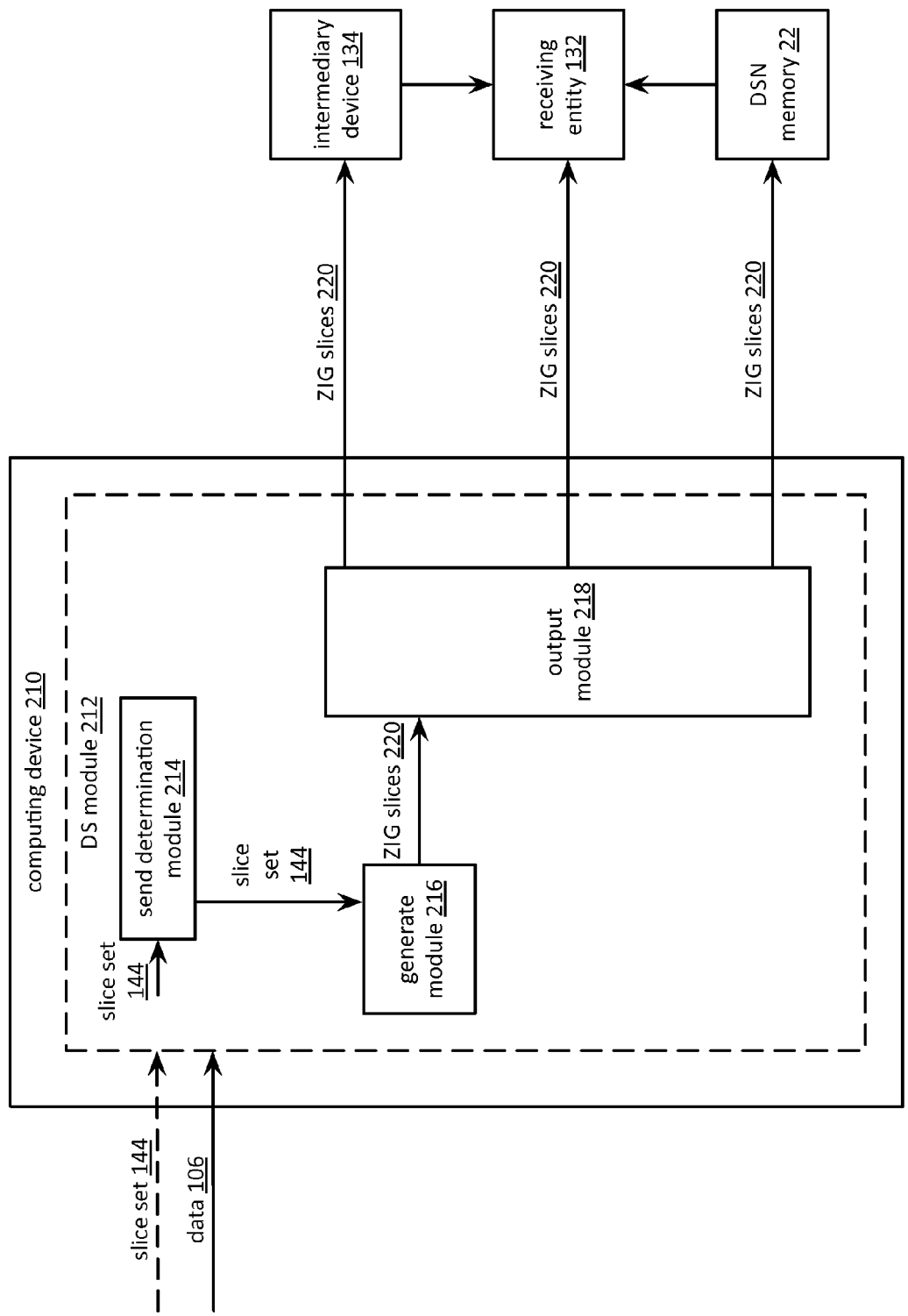
FIG. 9C is another schematic block diagram of an embodiment of a computing system in accordance with the present invention.

FIG. 9C is another schematic block diagram of an embodiment of a computing system that includes a computing device 210, a receiving entity 132, an intermediary device 134, and a dispersed storage network (DSN) memory 22. The receiving entity 132 may be implemented as at least one of a user device, a dispersed storage (DS) processing unit, a DS managing unit, and a DS unit. The intermediary device 134 may be implemented as at least one of a user device, a dispersed storage (DS) processing unit, a DS managing unit, and a DS unit. The computing device 210 may be implemented as at least one of a sending device, a user device, a dispersed storage (DS) processing unit, a DS managing unit, and a DS unit. For example, the computing device 210 is implemented utilizing a user device to send data, the intermediary device 134 is implemented as a second user device affiliated with the computing device 210, and the receiving entity 132 is implemented as a third user device. The computing device 210 includes a DS module 212. The DS module 212 includes a send determination module 214, a generate module 216, and an output module 218.

The DS module 212 obtains a set of encoded data slices 144. The obtaining includes at least one of receiving the set of encoded data slices 144, retrieving the set of encoded data slices 144, and generating the set of encoded data slices 144. For example, the DS module 212 encodes data 106 using a dispersed storage error coding function to produce the set of encoded data slices 144 when the obtaining includes generating the set of encoded data slices 144. The data 106 can be recreated from a decode threshold number of encoded data slices of the set of encoded data slices 144.

The send determination module 214 determines whether to send an encoded data slice of set of encoded data slices 144 in accordance with a zero information gain (ZIG) format. The send determination module 214 functions to determine whether to send the encoded data slice in the ZIG format by at least one of a variety of approaches. A first approach includes receiving an error message with regards to a previous transmission of the encoded data slice. A second approach includes determining that the encoded data slice is of a first priority type (e.g., a security risk if the slice were to be transmitted as is). A third approach includes receiving a request for transmission of the encoded data slice. A fourth approach includes determining that a slice name associated with the encoded data slice is on a list (e.g., slice names not to be sent directly).

When the encoded data slice is to be sent in accordance with the ZIG format, the generate module 216 selects a partial encoding threshold number of encoded data slices of the set of encoded data slices 144. The partial encoding threshold number of encoded data slices does not include the encoded data slice. The generate module 216 functions to select the partial encoding threshold number of encoded data slices by selecting a subset of encoded data slices of the set of encoded data slices 144 to fulfill the decode threshold number of encoded data slices requirement for recreating the data. The selecting the subset of encoded data slices includes at least one of a variety of approaches. A first approach includes selecting at least one of the subset of encoded data slices to include encoded error code blocks (e.g., may choose an error coded slice rather than a data slice when a unity matrix is utilized within an encoding matrix used to generate the set of encoded data slices). A second approach includes selecting at least one other of the subset of encoded data slices to include encoded data blocks (e.g., an indicator from a receiving entity indicates that a corresponding ZIG encoded data slice already exists).

The generate module 216 generates a set of ZIG encoded data slices 220 based on a ZIG function and the partial encoding threshold number of encoded data slices. The set of ZIG encoded data slices 220 represents recovery information of the encoded data slice. The generate module 216 generates a ZIG encoded data slice of the set of ZIG encoded data slices 220 by generating a decoding matrix for the encoded data slice based on an encoding matrix of the dispersed storage error coding function and generating the ZIG encoded data slice based on the decoding matrix and on a first encoded data slice of the partial encoding threshold number of encoded data slices.

The generate module 216 generates the decoding matrix by reducing the encoding matrix to produce a square matrix based on the partial encoding threshold number of encoded data slices and inverting the square matrix to produce the decoding matrix. The generate module 216 generates the ZIG encoded data slice based on the decoding matrix and on the encoded data slice by a series of steps. A first step includes encoding the first encoded data slice using the decoding matrix to produce a vector. The encoding includes matrix multiplying the decoding matrix by the first encoded data slice to produce the vector. A second step includes encoding the vector by a row of the decoding matrix corresponding to the encoded data slice to produce the ZIG encoded data slice. The encoding includes multiplying the vector by a row of the decoding matrix corresponding to the encoded data slice to produce the ZIG encoded data slice.

Alternatively, the generate module 216 generates the ZIG encoded data slice of the set of ZIG encoded data slices by a series of alternative steps. A first alternate step includes generating the decoding matrix for the encoded data slice based on the encoding matrix of the dispersed storage error coding function. A second alternative step includes generating a first initial ZIG encoded data slice based on the decoding matrix and on a first encoded data slice of the partial encoding threshold number of encoded data slices. A third alternative step includes generating a second initial ZIG encoded data slice based on the decoding matrix and on a second encoded data slice of the partial encoding threshold number of encoded data slices. A fourth alternative step includes combining (e.g., exclusive OR) the first and second initial ZIG encoded data slices to produce the ZIG encoded data slice.

The output module 218 outputs the set of ZIG encoded data slices 220. The output module 218 outputs the set of ZIG encoded data slices 220 by at least one of a variety of approaches. A first approach includes outputting a first one of the set of ZIG encoded data slices 220 on a first path and outputting a second one of the set of ZIG encoded data slices 220 on a second path. A second approach includes outputting to a receiving entity in support of a communication with the receiving entity (e.g., via a network). A third approach includes outputting to a dispersed storage network (DSN) memory for storage therein (e.g., generate write slice requests, output the requests). A fourth approach includes outputting to at least one intermediary device (e.g., a retrieving entity has a predetermined list of devices including the at least one intermediary device). Prior to outputting the set of ZIG encoded data slices 220, the output module 218 may output by obfuscating at least one ZIG encoded data slice of the set of ZIG encoded data slices 220 utilizing an obfuscation function (e.g., exclusive OR with a shared secret of the receiving entity, encrypt utilizing a key known to the receiving entity).

Figure 9D:
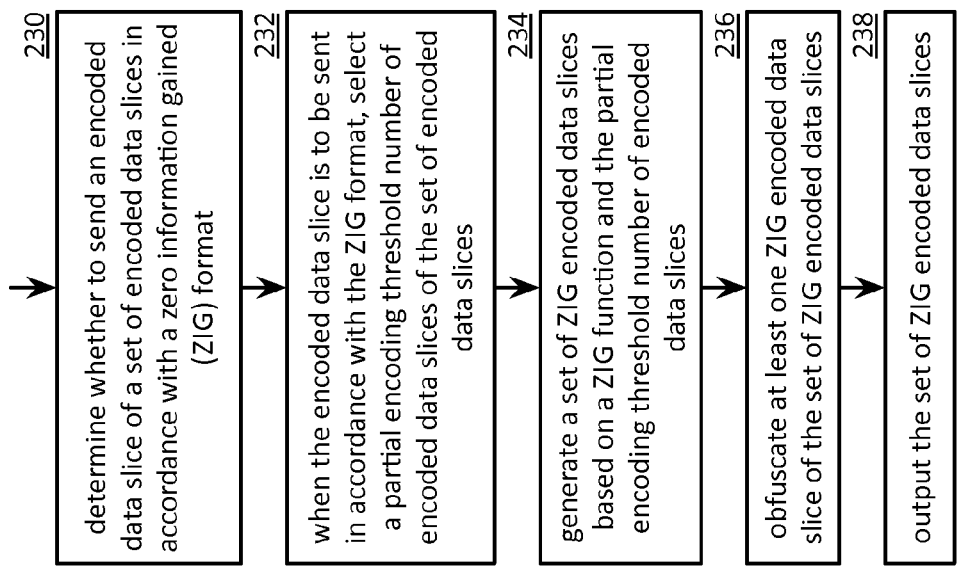
FIG. 9D is a flowchart illustrating an example generating a set of zero information gain (ZIG) encoded data slices in accordance with the present invention.

FIG. 9D is a flowchart illustrating an example generating a set of zero information gain (ZIG) encoded data slices. The method begins at step 230 were a processing module (e.g., of a sending entity) determines whether to send an encoded data slice of a set of encoded data slices in accordance with a zero information gain (ZIG) format. Data is encoded using a dispersed storage error coding function to produce the set of encoded data slices. The data can be recreated from a decode threshold number of encoded data slices of the set of encoded data slices. The determining whether to send the encoded data slice in the ZIG format includes at least one of a variety of approaches. A first approach includes receiving an error message with regards to a previous transmission of the encoded data slice. A second approach includes determining that the encoded data slice is of a first priority type; (e.g., high-priority). A third approach includes receiving a request for transmission of the encoded data slice (e.g., utilizing the ZIG format). A fourth approach includes determining that a slice name associated with the encoded data slice is on a list. (e.g., a list of slice names slated for utilizing the ZIG format).

When the encoded data slice is to be sent in accordance with the ZIG format, the method continues at step 232 where the processing module selects a partial encoding threshold number of encoded data slices of the set of encoded data slices. The partial encoding threshold number of encoded data slices does not include the encoded data slice. The selecting the partial encoding threshold number of encoded data slices includes a series of steps. A first step includes selecting a subset of encoded data slices of the set of encoded data slices to fulfill the decode threshold number of encoded data slices requirement for recreating the data. The selecting the subset of encoded data slices includes at least one of selecting at least one of the subset of encoded data slices to include encoded error code blocks (e.g., may choose an error coded slice rather than a data slice) and selecting at least one other of the subset of encoded data slices to include encoded data blocks (e.g., indicator from a receiving entity indicates that a corresponding ZIG encoded data slice already exists).

The method continues at step 234 where the processing module generates a set of ZIG encoded data slices based on a ZIG function and the partial encoding threshold number of encoded data slices. The set of ZIG encoded data slices represents recovery information of the encoded data slice. The generating the ZIG encoded data slice of the set of ZIG encoded data slices includes generating a decoding matrix for the encoded data slice based on an encoding matrix of the dispersed storage error coding function and generating the ZIG encoded data slice based on the decoding matrix and on a first encoded data slice of the partial encoding threshold number of encoded data slices. The generating the decoding matrix includes reducing the encoding matrix to produce a square matrix based on the partial encoding threshold number of encoded data slices and inverting the square matrix to produce the decoding matrix.

The generating the ZIG encoded data slice based on the decoding matrix and on the encoded data slice includes a series of steps. A first step includes encoding the first encoded data slice using the decoding matrix to produce a vector. The encoding includes matrix multiplying the decoding matrix by the first encoded data slice to produce the vector. A second step includes encoding the vector by a row of the decoding matrix corresponding to the encoded data slice to produce the ZIG encoded data slice. The encoding includes multiplying the vector by a row of the decoding matrix corresponding to the encoded data slice to produce the ZIG encoded data slice.

Alternatively, when utilizing two or more communication paths and/or intermediary devices that include storage, the generating the ZIG encoded data slice of the set of ZIG encoded data slices includes an alternate series of steps. A first alternate step includes generating a decoding matrix for the encoded data slice based on an encoding matrix of the dispersed storage error coding function. A second alternate step includes generating a first initial ZIG encoded data slice based on the decoding matrix and on a first encoded data slice of the partial encoding threshold number of encoded data slices. A third alternate step includes generating a second initial ZIG encoded data slice based on the decoding matrix and on a second encoded data slice of the partial encoding threshold number of encoded data slices. A fourth alternate step includes combining (e.g., exclusive OR) the first and second initial ZIG encoded data slices to produce the ZIG encoded data slice.

Prior to outputting the set of ZIG encoded data slices, the method continues at step 236 where the processing module obfuscates at least one ZIG encoded data slice of the set of ZIG encoded data slices utilizing an obfuscation function. The method continues at step 238 where the processing module outputs the set of ZIG encoded data slices. The outputting the set of ZIG encoded data slices includes at least one of a series of steps. A first step includes outputting a first one of the set of ZIG encoded data slices on a first path and outputting a second one of the set of ZIG encoded data slices on a second path. A second step includes outputting to a receiving entity in support of a communication with the receiving entity (e.g., via a network). A third step includes outputting to a dispersed storage network (DSN) memory for storage therein (e.g., generate write slice requests, output the requests). A fourth step includes outputting to at least one intermediary device (e.g., retrieving entity has a predetermined list of user devices to retrieve).

Figure 10:
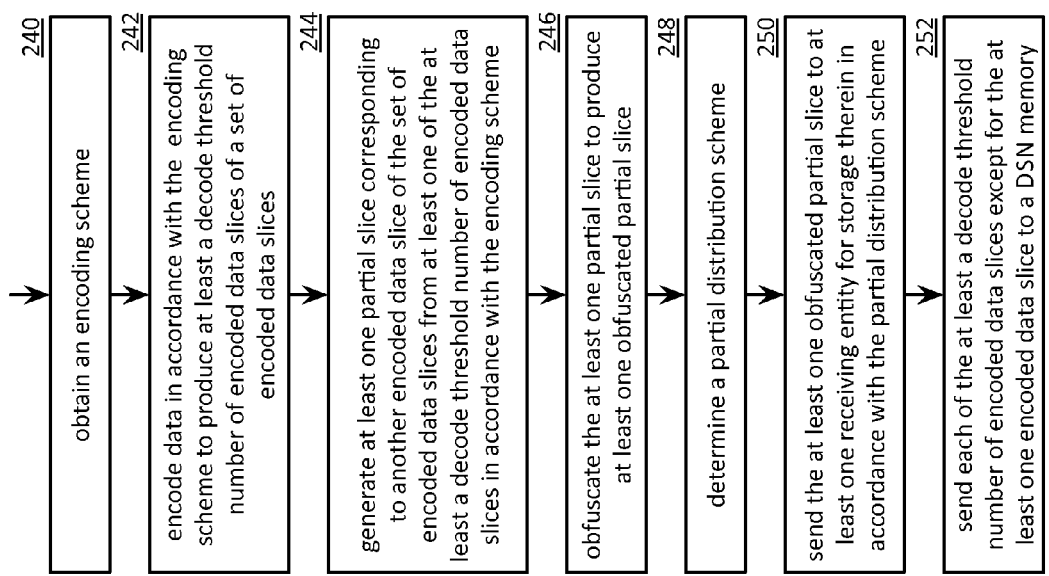
FIG. 10 is a flowchart illustrating an example of storing encoded data in accordance with the present invention.

FIG. 10 is a flowchart illustrating an example of storing encoded data. The method begins at step 240 where a processing module (e.g., of a sending dispersed storage (DS) processing, of a user device, of a DS processing unit) obtains an encoding scheme. The obtaining includes at least one of receiving, retrieving, and determining. The encoding scheme includes one or more of a decode threshold number, a number of encoded data slices to send, a number of zero information gain encoded data slices to send, an obfuscation of slices indicator, a security requirement, a performance requirement, and a reliability requirement. The method continues at step 242 where the processing module encodes data in accordance with the encoding scheme to produce at least a decode threshold number of encoded data slices of a set of encoded data slices. The method continues at step 244 where the processing module generates at least one partial slice corresponding to another encoded data slice of the set of encoded data slices from at least one of the least a decode threshold number of encoded data slices in accordance with the encoding scheme. The method continues at step 246 where the processing module obfuscates the at least one partial slice to produce at least one obfuscated partial slice.

The method continues at step 248 where the processing module determines a partial distribution scheme. The determination may be based on one or more of a goal, a security requirement, a reliability requirement, a performance requirement, a receiving entity list, the data, the data type of the data, a received message, the list, and a lookup. For example, the processing module determines the partial distribution scheme to include sending an obfuscated partial slice to each user device of a plurality of user devices for storage therein based on a security requirement to utilize trusted user devices. As another example, the processing module determines the partial distribution scheme to include sending all obfuscated partial slices to a dispersed storage network (DSN) memory for storage therein when a performance requirement indicates to utilize the DSN memory for fast retrievals.

The method continues at step 250 where the processing module sends the at least one obfuscated partial slice to at least one receiving entity for storage therein in accordance with the partial distribution scheme. The method continues at step 252 where the processing module sends each of the at least a decode threshold number of encoded data slices except for the at least one encoded data slice to a DSN memory for storage therein.

Figure 11:
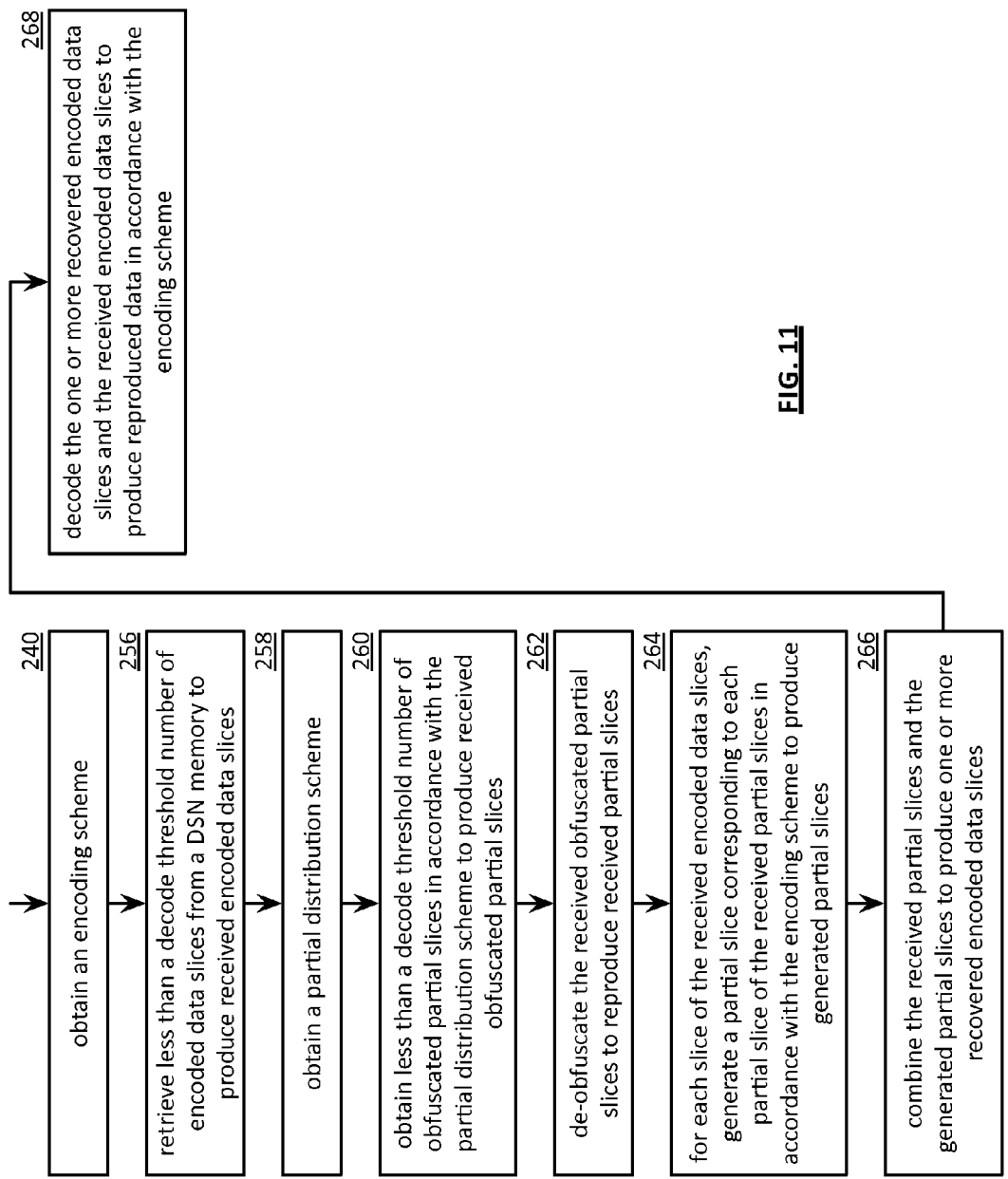
FIG. 11 is a flowchart illustrating an example of retrieving encoded data in accordance with the present invention.

FIG. 11 is a flowchart illustrating an example of retrieving encoded data, which includes similar steps to FIG. 10. The method begins with step 240 of FIG. 10 where a processing module (e.g., of a receiving dispersed storage (DS) processing, of a user device, of a DS processing unit) obtains an encoding scheme. The method continues at step 256 where the processing module retrieves less than a decode threshold number of encoded data slices from a dispersed storage network (DSN) memory to produce received encoded data slices. For example, a processing module determines to retrieve the encoded data slices from a DSN memory based on an indication of the encoding scheme to retrieve the encoded data slices from the DSN memory. As another example, the processing module receives a message from a sending entity indicating to retrieve the encoded data slices from the DSN memory.

The method continues at step 258 where the processing module obtains a partial distribution scheme. The obtaining may be based on one or more of a lookup, a predetermination, receiving the partial distribution scheme from a sending DS processing unit, retrieving from the DSN memory, and determining the partial distribution scheme based on one or more of a goal, a security requirement, a reliability requirement, a performance requirement, a receiving entity list, the data, the data type of the data, a received message, and a lookup. For example, the processing module obtains the partial distribution scheme from the sending entity. For instance, the partial distribution scheme indicates that an obfuscated partial has been stored in each user device of a plurality of user devices. As another example, the processing module obtains the partial distribution scheme based on a DSN memory retrieval. For instance, the partial distribution scheme indicates that all obfuscated partials are stored in the DSN memory.

The method continues at step 260 where the processing module obtains less than a decode threshold number of obfuscated partials in accordance with the partial distribution scheme to produce received obfuscated partials. The obtaining may include one or more of receiving from the sending entity, retrieving from the DSN memory, and retrieving from one or more user devices of a plurality of user devices. The method continues at step 262 where the processing module de-obfuscates the received obfuscated partial slices to reproduced received partial slices. The method continues at step 264 where the processing module generates a partial slice corresponding to each partial slice of the received partial slices in accordance with the encoding scheme to produce generated partial slices for each slice of the received encoded data slices. The method continues at step 266 where the processing module combines the received partials and the generated partials to produce one or more recovered encoded data slices. The method continues at step 268 where the processing module decodes the one or more recovered encoded data slices and the received encoded data slices to produce reproduced data in accordance with the encoding scheme.

Figure 12:
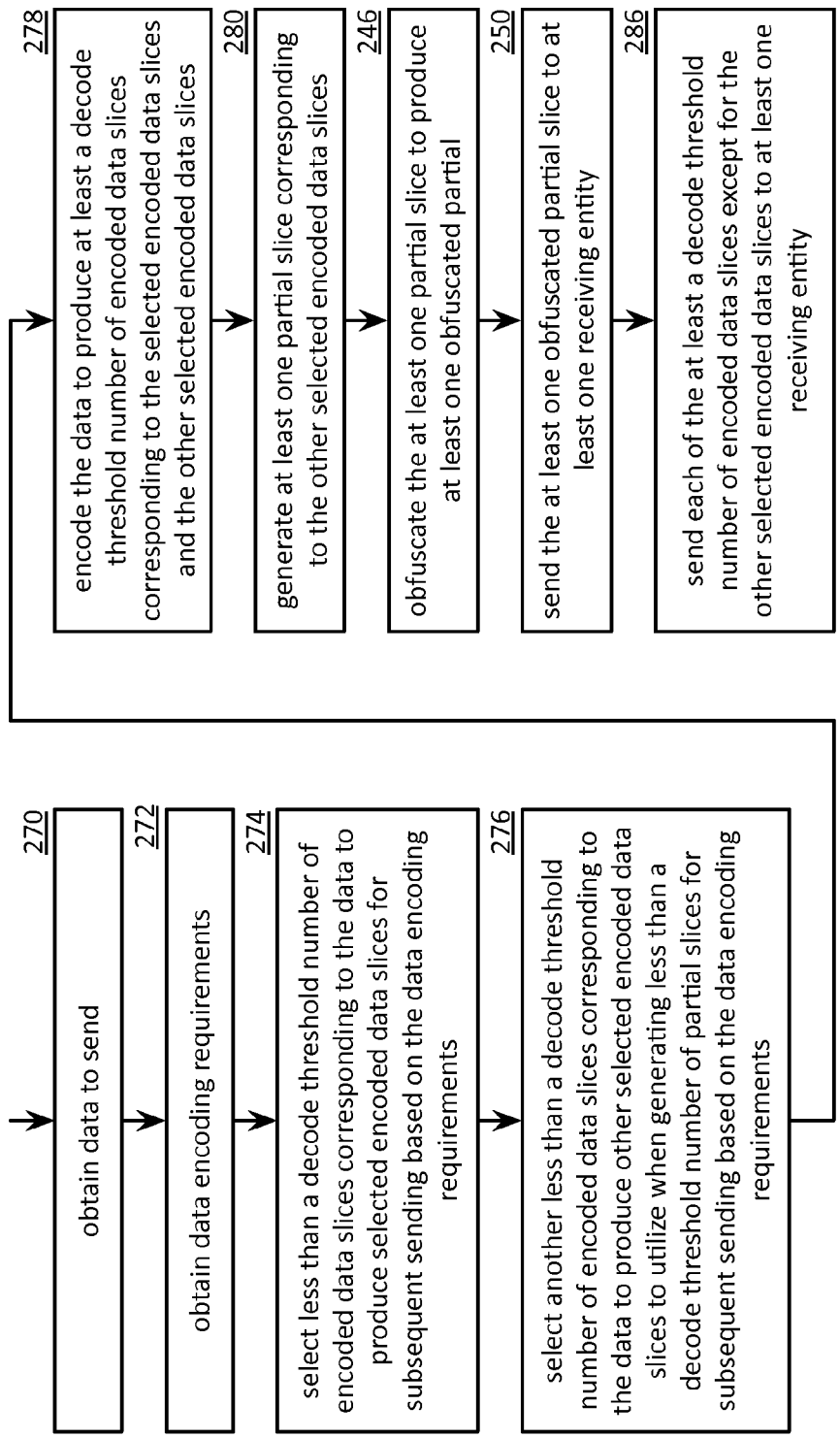
FIG. 12 is a flowchart illustrating an example of determining parameters of an encoding scheme in accordance with the present invention.

FIG. 12 is a flowchart illustrating an example of determining parameters of an encoding scheme, which includes similar steps to FIG. 10. The method begins at step 270 where a processing module (e.g., of a sending dispersed storage (DS) processing, of a user device, of a DS processing unit) obtains data to send. The obtaining includes at least one of retrieving the data, receiving the data, initiating a query with regards to the data, generating the data, and looking up the data. The method continues at step 272 where the processing module obtains data encoding requirements. The data encoding requirements includes at least one of a security requirement, a bandwidth utilization requirement, a latency requirement, a predetermined requirement, a number of receiving entities, and an error coding dispersal storage function parameter requirement. The obtaining includes at least one of retrieving the data encoding requirements, receiving the data encoding requirements, initiating a query with respect to the data encoding requirements, generating the data encoding requirements, and looking up the data encoding requirements.

The method continues at step 274 where the processing module selects less than a decode threshold number of encoded data slices corresponding to the data to produce selected encoded data slices for subsequent sending based on the data encoding requirements. For example, the processing module selects the number of encoded data slices to be one when the data encoding requirements indicates to send just one slice based on a security requirement and the error coding dispersal storage function parameters include a pillar width of 5 and a decode threshold of 3. As another example, the processing module selects the number of encoded data slices to be two when the data encoding requirements indicates to send two slices based on a performance requirement and the error coding dispersal storage function parameters include a pillar width of 5 and a decode threshold of 3.

The method continues at step 276 where the processing module selects another less than a decode threshold number of encoded data slices corresponding to the data to produce other selected encoded data slices to utilize when generating less than a decode threshold number of partials for subsequent sending based on the data encoding requirements. For example, the processing module selects encoded data slices 4 and 5 as the another encoded data slices when the data encoding requirements indicates to send just encoded data slice 1 based on a security requirement and the error coding dispersal storage function parameters include a pillar width of 5 and a decode threshold of 3. As another example, the processing module selects encoded data slice 4 as the another encoded data slice when the data encoding requirements indicates to send encoded data slices 1 and 2 based on a performance requirement and the error coding dispersal storage function parameters include a pillar width of 5 and a decode threshold of 3.

The method continues at step 278 where the processing module encodes the data to produce at least a decode threshold number of encoded data slices corresponding to the selected encoded data slices and the other selected encoded data slices. For example, the processing module encodes the data to produce encoded data slices 1, 4, and 5 when the selected encoded data slices includes encoded data slice 1 and the other selected encoded data slices includes encoded data slices 4 and 5. As another example, the processing module encodes the data to produce encoded data slices 1, 2, and 4 when the selected encoded data slices includes encoded data slices 1 and 2 and the other encoded data slices includes encoded data slice 4.

The method continues at step 280 where the processing module generates at least one partial corresponding to the other selected encoded data slices. For example, the processing module generates partial slices p (2,4) and p (3,4) corresponding to encoded data slice 4 and the processing module generates partial slices p (2,5) and p (3,5) corresponding to encoded data slice 5 when the other selected encoded data slices includes encoded data slices 4 and 5 and the selected encoded data slices includes encoded data slice 1. As another example, the processing module generates partial slice p (3,4) corresponding to encoded data slice 4 when the other selected encoded data slices includes encoded data slice 4 and the selected encoded data slices includes encoded data slices 1 and 2.

The method continues with steps 246 and 250 of FIG. 10 where the processing module obfuscates the at least one partial slice to produce at least one obfuscated partial slice and sends the at least one obfuscated partial slice to at least one receiving entity. The method continues at step 286 where the processing module sends each of the at least a decode threshold number of encoded data slices except for the other selected encoded data slices to at least one receiving entity. For example, the processing module sends encoded data slice 1 when the other selected encoded data slices includes encoded data slices 4 and 5 and the selected encoded data slices includes encoded data slice 1. As another example, the processing module sends encoded data slices 1 and 2 when the other selected encoded data slices includes encoded data slice 4 and the selected encoded data slices includes encoded data slices 1 and 2.

Figure 13:
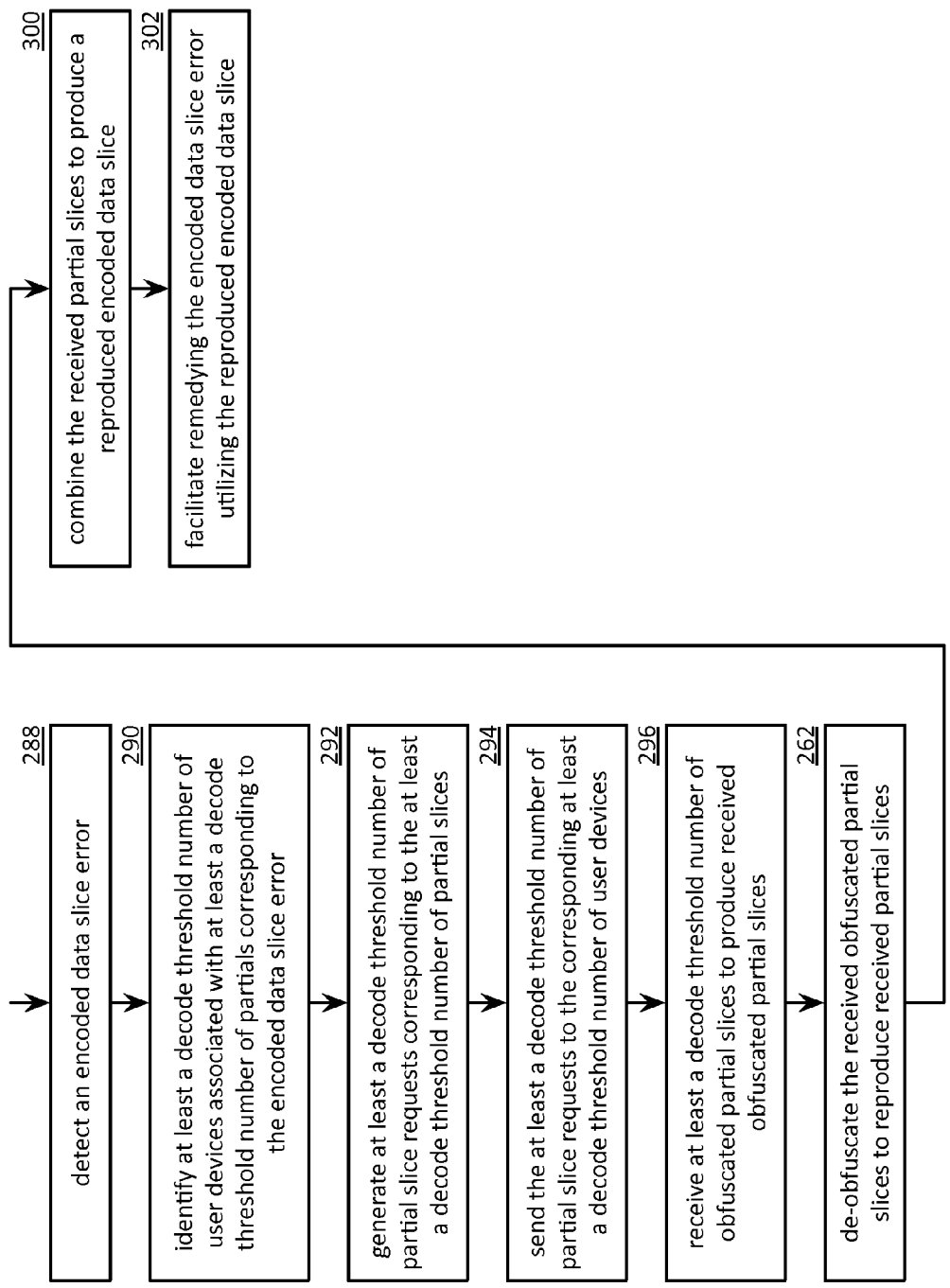
FIG. 13 is a flowchart illustrating an example of rebuilding an encoded data slice in error in accordance with the present invention.

FIG. 13 is a flowchart illustrating an example of rebuilding an encoded data slice in error in accordance with the invention, which includes similar steps to FIG. 11. The method begins at step 288 where a processing module (e.g., of a dispersed storage (DS) processing, a storage integrity processing unit, a DS unit, a DS processing unit, a user device) detects an encoded data slice error. The encoded data slice error includes at least one of a corrupted encoded data slice, a tampered encoded data slice, an encoded data slice that fails an integrity check, and a missing the encoded data slice. The detection may be based on one or more of receiving an error message, receiving a rebuilding message, a query, and an integrity test.

The method continues at step 290 where the processing module identifies a least a decode threshold number of user devices associated with at least a decode threshold number of partial slices corresponding to the encoded data slice error. The identifying includes at least one of receiving user device identifiers (IDs), performing a lookup, performing a query, obtaining an encoding scheme, and obtaining a partial distribution scheme.

The method continues at step 292 where the processing module generates at least a decode threshold number of partial slice requests corresponding to the at least a decode threshold number of partial slices. Each partial slice request includes at least one of an encoded data slice ID, a pillar index, participant pillar IDs, and encoding matrix, an encoding scheme, a partial distribution scheme, and a requesting entity ID.

The method continues at step 294 where the processing module sends the least a decode threshold number of partial slice requests to the corresponding at least a decode threshold number of user devices. The processing module may send a partial slice request directly to a user device and/or indirectly via an intermediate user device. For example, the processing module sends partial slice requests to user devices 1, and 3-6. Each partial slice request indicates pillar index 2 and user device participants 1, 3-6 when a pillar width is 8 and a decode threshold is 5. Each user device produces an obfuscated partial slice in response to the partial slice request based on at least one of a retrieval from a local memory, a dispersed storage network (DSN) memory retrieval, and generating the partial slice based on a corresponding stored slice. Each user device may obfuscate the partial slice when the partial slice is not already obfuscated.

The method continues at step 296 where the processing module receives at least a decode threshold number of obfuscated partial slices to produce received obfuscated partial slices. The received obfuscated partial slices may already include combinations (e.g., resulting from an exclusive OR logical function) of two or more obfuscated partial slices. The method continues with step 262 of FIG. 11 where the processing module de-obfuscates the received obfuscated partial slices to produce received partial slices. For example, the processing module may utilize an obfuscation value that includes a unique shared secret with each of the plurality of user devices.

The method continues at step 300 where the processing module combines the received partial slices to produce a reproduced encoded data slice corresponding to the encoded data slice error. Alternatively, the processing module may simultaneously de-obfuscate the received obfuscated partial slices and combine the received partial slices to produce the reproduced encoded data slice. For example, the processing module produces a reproduced encoded data slice 2 utilizing a function: slice 2=(K1)⊕(K1)⊕partial (2,1)⊕(K3)⊕(K3)⊕partial (2,3)⊕(K4)⊕(K4)⊕partial (2,4)⊕(K5)⊕(K5)⊕partial (2,5)⊕(K6)⊕(K6)⊕ partial (2,6) when K1 is shared secret obfuscation value associated with user device 1 (e.g., (K1) ⊕partial (2,1) is received obfuscated partial slice op (2,1)) and the processing module for regenerating encoded data slice 2, K3 is shared secret obfuscation value associated with user device 3 and the processing module, K4 is shared secret obfuscation value associated with user device 4 and the processing module, K5 is shared secret obfuscation value associated with user device 5 and the processing module, and K6 is shared secret obfuscation value associated with user device 6 and the processing module.

The method continues at step 302 where the processing module facilitates remedying the encoded data slice error utilizing the reproduced encoded data slice. The facilitation includes at least one of storing the reproduced encoded data slice in the DSN memory, writing over the encoded data slice error with the reproduced encoded data slice, sending the reproduced encoded data slice to a DS unit, sending the reproduced encoded data slice to a user device, and sending the reproduced encoded data slice to a receiving DS processing.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a processing module of a computing device of a dispersed storage network (DSN), the method comprises:

dispersed storage error encoding, by the processing module and in accordance with distributed data storage parameters, a data segment to produce a set of encoded data slices and a set of zero information gain (ZIG) encoded data slices, wherein the set of encoded data slices is encoded in accordance with a dispersed storage error encoding scheme and wherein the set of ZIG encoded data slices is encoded using a ZIG function and further wherein a first ZIG encoded data slice of the set of ZIG encoded data slices is generated by matrix multiplying a first decoding matrix and a first encoded data slice of the set of encoded data slices, wherein generating the first ZIG encoded data slice includes generating a first partial encoded data slice based on the first decoding matrix, the first encoded data slice and a row of the encoding matrix corresponding to the first encoded data slice, generating a second partial encoded data slice based on a second decoding matrix, a second encoded data slice and a row of the encoding matrix corresponding to the second encoded data slice, wherein the second encoded data slice is an encoded data slice of the set of encoded data slices and not included in the subset of encoded data slices, and combining the first and second partial encoded data slices to produce the first ZIG encoded data slice;

selecting, by the processing module, a first subset of encoded data slices from the set of encoded data slices, wherein the first subset of encoded data slices includes less than a threshold number of encoded data slices, and further wherein the threshold number of encoded data slices is required to recreate the data segment;

sending, by the processing module via an interface of the computing device, the subset of encoded data slices to a first memory within the DSN for storage therein; and sending, by the processing module via the interface, the set of ZIG encoded data slices to a second memory within the DSN for storage therein.

2. The method of claim 1, wherein generating the first ZIG encoded data slice further comprises:
matrix multiplying the first decoding matrix and the first encoded data slice to produce a vector; and
matrix multiplying the vector by a row of the encoding matrix corresponding to the first encoded data slice to produce the first ZIG encoded data slice.

3. The method of claim 1 further comprises:
generating the first decoding matrix by:
reducing an encoding matrix to produce a square matrix that exclusively includes rows associated with the subset of encoded data slices and an encoded data slice being represented by the first ZIG encoded data slice; and
inverting the square matrix to produce the decoding matrix.

4. The method of claim 1, wherein the sending the set of ZIG encoded data slices comprises:
prior to sending, obfuscating the first ZIG encoded data slice using an obfuscating function.

5. The method of claim 4, wherein the obfuscating function comprises one of:
exclusive ORing the first ZIG encoded data slice with an obfuscating value;
masking the first ZIG encoded data slice;
encrypting the first ZIG encoded data slice; and
performing a deterministic function on the first ZIG encoded data slice.

6. A dispersed storage (DS) module of a dispersed storage network (DSN) comprises:
a first module, when operable within a computing device, causes the computing device to:
dispersed storage error encode in accordance with distributed data storage parameters, a data segment of data to produce a set of encoded data slices and a set of zero information gain (ZIG) encoded data slices, wherein the set of encoded data slices is encoded in accordance with a dispersed storage error encoding scheme and wherein the set of ZIG encoded data slices is encoded using a ZIG function, wherein a first ZIG encoded data slice of the set of ZIG encoded data slices is generated by matrix multiplying a first decoding matrix and a first encoded data slice of the set of encoded data slices and wherein the generating the first ZIG encoded data slice includes:
generating a first partial encoded data slice based on the first decoding matrix, the first encoded data slice and a row of the encoding matrix corresponding to the first encoded data slice;
generating a second partial encoded data slice based on a second decoding matrix, a second encoded data slice and a row of the encoding matrix corresponding to the second encoded data slice, wherein the second encoded data slice is an encoded data slice of the set of encoded data slices and not included in the subset of encoded data slices; and
combining the first and second partial encoded data slices to produce the first ZIG encoded data slice;
select a first subset of encoded data slices from the set of encoded data slices, wherein the first subset of encoded data slices includes less than a threshold number of encoded data slices, and further wherein the threshold number of encoded data slices is required to recreate the data segment; and
a second module, when operable within the computing device, causes the computing device to:
send, via an interface of the computing device, the subset of encoded data slices to a first memory within the DSN for storage therein; and
send, via the interface, the set of ZIG encoded data slices to a second memory within the DSN for storage therein.

7. The DS module of claim 6, wherein the first module, when operable within the computing device, further causes the computing device to generate the first ZIG encoded data slice by:
matrix multiplying the first decoding matrix and the first encoded data slice to produce a vector; and
matrix multiplying the vector by a row of the encoding matrix corresponding to the first encoded data slice to produce the first ZIG encoded data slice.

8. The DS module of claim 6, wherein the first module, when operable within the computing device, causes the computing device to generate the first decoding matrix by:
reducing an encoding matrix to produce a square matrix that exclusively includes rows associated with the subset of encoded data slices and an encoded data slice being represented by the first ZIG encoded data slice; and
inverting the square matrix to produce the decoding matrix.

9. The DS module of claim 6, wherein the second module, when operable within the computing device, further causes the computing device to send the set of ZIG encoded data slices by:
prior to sending, obfuscating the first ZIG encoded data slice using an obfuscating function.

10. The DS module of claim 9, wherein the obfuscating function comprises one of:
exclusive ORing the first ZIG encoded data slice with an obfuscating value;
masking the first ZIG encoded data slice;
encrypting the first ZIG encoded data slice; and
performing a deterministic function on the first ZIG encoded data slice.

* * * * *